United States Patent
Maturana et al.

(10) Patent No.: US 9,838,476 B2
(45) Date of Patent: *Dec. 5, 2017

(54) ON-PREMISE DATA COLLECTION AND INGESTION USING INDUSTRIAL CLOUD AGENTS

(71) Applicant: Rockwell Automation Technologies, Inc., Mayfield Heights, OH (US)

(72) Inventors: Francisco P. Maturana, Lyndhurst, OH (US); Juan L. Asenjo, Timberlake, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 66 days.

This patent is subject to a terminal disclaimer.

(21) Appl. No.: 14/525,131

(22) Filed: Oct. 27, 2014

(65) Prior Publication Data
US 2015/0281355 A1 Oct. 1, 2015

Related U.S. Application Data

(60) Provisional application No. 61/970,798, filed on Mar. 26, 2014.

(51) Int. Cl.
*G06F 15/16* (2006.01)
*H04L 29/08* (2006.01)
(Continued)

(52) U.S. Cl.
CPC ........ *H04L 67/1097* (2013.01); *G06F 9/5072* (2013.01); *G06F 9/548* (2013.01); *H04L 67/2828* (2013.01)

(58) Field of Classification Search
CPC . H04L 67/1097; H04L 67/2828; G06F 9/548; G06F 9/5072
See application file for complete search history.

(56) References Cited

U.S. PATENT DOCUMENTS

| 5,519,605 A | 5/1996 | Cawlfield |
|---|---|---|
| 6,230,010 B1 | 5/2001 | Morris |

(Continued)

FOREIGN PATENT DOCUMENTS

| CN | 1755564 | 4/2006 |
|---|---|---|
| CN | 1937559 | 3/2007 |

(Continued)

OTHER PUBLICATIONS

Office Action for U.S. Appl. No. 14/665,128, dated Jul. 20, 2016, 9 pages.

(Continued)

*Primary Examiner* — Michael A Keller
(74) *Attorney, Agent, or Firm* — Amin, Turocy & Watson, LLP

(57) ABSTRACT

A cloud agent facilitates collection of industrial data from one or more data sources on the plant floor and migration of the collected data to a cloud platform for storage and processing. Collection services associated with the cloud agent perform on-premise data collection of historical, live, and/or alarm data directly from industrial devices networked to the agent or from intermediate data concentrators that gather the data from the devices. Queue processing services executed by the cloud agent package the data into a data packet comprising header information that identifies a customer associated with the industrial enterprise, processing priority information, and other information that informs data processing services on the cloud platform how to process and/or direct the incoming data. The cloud agent then establishes a communication channel to the cloud platform and sends the data via the channel.

20 Claims, 17 Drawing Sheets

(51) Int. Cl.
G06F 9/50 (2006.01)
G06F 9/54 (2006.01)

(56) References Cited

U.S. PATENT DOCUMENTS

| | | | |
|---|---|---|---|
| 6,609,034 B1 | 8/2003 | Behrens et al. | |
| 6,640,241 B1 | 10/2003 | Ozzie et al. | |
| 6,675,226 B1 | 1/2004 | Nair et al. | |
| 7,133,908 B1 | 11/2006 | Pajak et al. | |
| 7,159,209 B1 | 1/2007 | Srinivasan et al. | |
| RE39,989 E | 1/2008 | Morris | |
| 7,676,287 B2 | 3/2010 | Eryurek et al. | |
| 8,219,216 B2 | 7/2012 | Klug et al. | |
| 8,275,847 B2 | 9/2012 | Lewis | |
| 2003/0014387 A1 | 1/2003 | Kreidler et al. | |
| 2003/0083754 A1 | 5/2003 | Tripathi et al. | |
| 2003/0212818 A1* | 11/2003 | Klein | H04L 51/12 709/238 |
| 2004/0141517 A1 | 7/2004 | Balasubramanian et al. | |
| 2004/0230859 A1 | 11/2004 | Cochran et al. | |
| 2005/0010333 A1* | 1/2005 | Lorton | A01K 29/00 700/275 |
| 2005/0154477 A1 | 7/2005 | Martin et al. | |
| 2005/0193285 A1 | 9/2005 | Jeon | |
| 2006/0068762 A1 | 3/2006 | Baldwin et al. | |
| 2006/0294047 A1 | 12/2006 | Johnston et al. | |
| 2007/0019641 A1 | 1/2007 | Pai et al. | |
| 2008/0168092 A1 | 7/2008 | Boggs et al. | |
| 2008/0317058 A1* | 12/2008 | Williams | H04M 3/523 370/417 |
| 2009/0089227 A1 | 4/2009 | Sturrock et al. | |
| 2009/0183201 A1 | 7/2009 | Dasgupta | |
| 2009/0198350 A1 | 8/2009 | Thiele | |
| 2009/0265036 A1 | 10/2009 | Jamieson et al. | |
| 2009/0326892 A1 | 12/2009 | Lin | |
| 2010/0070852 A1 | 3/2010 | Li | |
| 2010/0256794 A1 | 10/2010 | McLaughlin et al. | |
| 2010/0256795 A1* | 10/2010 | McLaughlin | G05B 19/4183 700/110 |
| 2010/0257228 A1 | 10/2010 | Staggs et al. | |
| 2011/0066298 A1 | 3/2011 | Francino | |
| 2011/0103393 A1 | 5/2011 | Meier et al. | |
| 2011/0134930 A1 | 6/2011 | McLaren et al. | |
| 2011/0145836 A1* | 6/2011 | Wheeler | G06F 9/542 719/314 |
| 2012/0143378 A1* | 6/2012 | Spears | H04L 12/282 700/275 |
| 2012/0166963 A1 | 6/2012 | Kohli et al. | |
| 2012/0232869 A1 | 9/2012 | Maturana et al. | |
| 2012/0331104 A1 | 12/2012 | Akiyama et al. | |
| 2013/0067090 A1 | 3/2013 | Batrouni et al. | |
| 2013/0081146 A1 | 3/2013 | Hakozaki | |
| 2013/0110298 A1 | 5/2013 | Beveridge | |
| 2013/0123965 A1 | 5/2013 | Cooper et al. | |
| 2013/0124253 A1 | 5/2013 | Cooper et al. | |
| 2013/0150986 A1 | 6/2013 | Timsjo et al. | |
| 2013/0191106 A1 | 7/2013 | Kephart et al. | |
| 2013/0211559 A1 | 8/2013 | Lawson et al. | |
| 2013/0211870 A1 | 8/2013 | Lawson et al. | |
| 2013/0212420 A1 | 8/2013 | Lawson et al. | |
| 2013/0225151 A1 | 8/2013 | King et al. | |
| 2013/0227446 A1 | 8/2013 | Zala et al. | |
| 2013/0262678 A1* | 10/2013 | Tung | G06F 9/5072 709/226 |
| 2013/0266193 A1 | 10/2013 | Tiwari et al. | |
| 2013/0269020 A1 | 10/2013 | Griffin et al. | |
| 2013/0283151 A1 | 10/2013 | Deguzman et al. | |
| 2013/0290952 A1 | 10/2013 | Childers, Jr. | |
| 2014/0047064 A1 | 2/2014 | Maturana et al. | |
| 2014/0047107 A1 | 2/2014 | Maturana et al. | |
| 2014/0115592 A1 | 4/2014 | Frean et al. | |
| 2014/0156234 A1 | 6/2014 | Maturana et al. | |
| 2014/0164124 A1* | 6/2014 | Rhoads | H04W 4/02 705/14.58 |
| 2014/0207868 A1 | 7/2014 | Gordon et al. | |
| 2014/0257528 A1 | 9/2014 | Perez et al. | |
| 2014/0269531 A1 | 9/2014 | Luna et al. | |
| 2014/0274005 A1 | 9/2014 | Luna et al. | |
| 2014/0280796 A1* | 9/2014 | Pijewski | H04L 41/0886 709/220 |
| 2014/0282015 A1 | 9/2014 | Nixon et al. | |
| 2014/0337473 A1 | 11/2014 | Frusina et al. | |
| 2015/0220080 A1 | 8/2015 | Nixon et al. | |

FOREIGN PATENT DOCUMENTS

| | | |
|---|---|---|
| CN | 103293953 | 9/2013 |
| CN | 203466840 | 3/2014 |
| CN | 103701953 A | 4/2014 |
| EP | 1422619 | 5/2004 |
| EP | 2228965 | 9/2010 |
| EP | 2541354 | 1/2013 |
| EP | 2592812 | 5/2013 |
| EP | 2660667 | 11/2013 |
| EP | 2704401 | 3/2014 |

OTHER PUBLICATIONS

Office Action for U.S. Appl. No. 14/634,174, dated Aug. 4, 2016, 11 pages.
Office Action from U.S. Appl. No. 14/525,144, dated Sep. 9, 2016, 28 pages.
Extended European Search Report for EP Application Serial No. 15160984.9, dated Jul. 4, 2016, 10 pages.
European Office Action for EP Application Serial No. 15160984.9, dated Aug. 8, 2016, 2 pages.
Extended European Search Report for EP Application Serial No. 15160944.3, dated Jul. 8, 2016, 9 pages.
European Office Action for EP Application Serial No. 15160944.3, dated Aug. 16, 2016, 2 pages.
Extended European Search Report for EP Application Serial No. 15160868.4, dated Jun. 29, 2016, 11 pages.
European Office Action for EP Application Serial No. 15160868.4, dated Aug. 1, 2016, 2 pages.
Extended European Search Report for EP Application Serial No. 15160980.7, dated Jul. 28, 2016, 10 pages.
Extended European Search Report for EP Application Serial No. 15160924.5, dated Jul. 14, 2016, 10 pages.
European Office Action for EP Application Serial No. 15160924.5, dated Aug. 22, 2016, 2016, 2 pages.
Extended European Search Report for EP Application Serial No. 15160941.9, dated Jul. 27, 2016, 12 pages.
Extended European Search Report for EP Application Serial No. 15160987.2, dated Jul. 11, 2016, 9 pages.
European Office Action for EP Application Serial No. 15160987.2, dated Aug. 16, 2016, 2 pages.
Steiner, J. G., et al., "Kerberos: An Authentication Service for Open Network Systems," Proceedings of the Winter Usenix Conference, Feb. 9, 1988, pp. 191-202.
Office Action for U.S. Appl. No. 14/634,174, dated Nov. 4, 2016, 25 pages.
Extended European Search Report for EP Application Serial No. 15160989.8, dated Sep. 22, 2016, 5 pages.
Extended European Search Report for EP Application Serial No. 15160988.0, dated Sep. 16, 2016, 9 pages.
European Office Action for EP Application Serial No. 15160941.9, dated Aug. 29, 2016, 2 pages.
European Office Action for EP Application Serial No. 15160980.7, dated Sep. 5, 2016, 2 pages.
European Office Action for EP Application Serial No. 15160988.0, dated Oct. 24, 2016, 2 pages.
Office Action for Chinese Application No. 201510136419.4, dated Apr. 21, 2017, 10 pages.
Office Action for Chinese Application No. 201510135130.0, dated May 3, 2017, 15 pages.
Office Action for U.S. Appl. No. 14/478,974, dated Jun. 15, 2017, 11 pages.

(56) References Cited

OTHER PUBLICATIONS

Office Action for U.S. Appl. No. 14/619,933 dated May 15, 2017, 11 pages.
Office Action for Chinese Application No. 201510138371.0 dated May 4, 2017, 15 pages.
Final Office Action for U.S. Appl. No. 14/525,149, dated Jul. 7, 2017, 77 pages.
Office Action for U.S. Appl. No. 14/562,233, dated Jan. 25, 2017, 25 pages.
Office Action for U.S. Appl. No. 14/525,149, dated Feb. 27, 2017, 76 pages.
Office Action for U.S. Appl. No. 14/634,174, dated Feb. 3, 2017, 12 pages.
Office Action for U.S. Appl. No. 14/525,144, dated Feb. 3, 2017, 42 pages.
Office Action for U.S. Appl. No. 14/639,279, dated Feb. 10, 2017, 110 pages.
Chinese Office Action and English Translation thereof dated Jul. 12, 2017, for Chinese Application Serial No. 201510138210.1, 17 pages.
Final Office Action for U.S. Appl. No. 14/639,279, dated Aug. 9, 2017, 66 pages.
Final Office Action for U.S. Appl. No. 14/562,233, dated Jul. 28, 2017, 33 pages.
Office Action for U.S. Appl. No. 14/525,149 dated Oct. 5, 2017, 88 pages.
Office Action for U.S. Appl. No. 15/431,128 dated Oct. 18, 2017, 37 pages.

* cited by examiner

US 9,838,476 B2

1

ON-PREMISE DATA COLLECTION AND INGESTION USING INDUSTRIAL CLOUD AGENTS

CROSS-REFERENCE TO RELATED APPLICATIONS

This application claims priority to U.S. Provisional Application Ser. No. 61/970,798, filed on Mar. 26, 2014, entitled "INDUSTRIAL CLOUD INFRASTRUCTURE FOR DATA INGESTION, MODELING, PROCESSING, ANALYTICS, AND REPORTING," the entirety of which is incorporated herein by reference.

BACKGROUND

The subject matter disclosed herein relates generally to industrial data collection, and, more particularly, to an on-premise cloud agent that facilitates collection and upload of industrial data to a cloud-based storage and processing infrastructure.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a cloud agent is provided comprising a collection services component configured to receive industrial data from a data source device of an industrial enterprise, and to compress the industrial data to yield a compressed data file; and a queue processing component configured to package the compressed data file with header information based on message queuing information maintained in a message queuing data store to yield a compressed data packet and to send the compressed data packet to a cloud platform, wherein the message queuing information comprises at least a customer identifier associated with the industrial enterprise and priority information specifying a processing priority for the industrial data.

Also, one or more embodiments provide a method for sending industrial data to a cloud platform, comprising collecting, by a cloud agent device comprising at least one processor, industrial data from a data source device of an industrial enterprise; compressing, by the cloud agent device, the industrial data to yield a compressed data file; appending, by the cloud agent device, the compressed data file with header information based on message queuing information maintained in a message queuing data store to yield a compressed data packet, wherein the message queuing information comprises at least a customer identifier associated with the industrial enterprise and priority information specifying a processing priority for the industrial data; and sending, by the cloud agent device, the compressed data packet to a cloud platform.

Also, according to one or more embodiments, a non-transitory computer-readable medium is provided having stored thereon instructions that, in response to execution, cause a cloud agent device to perform operations, the operations comprising receiving industrial data from a data source device associated with an industrial enterprise; packaging the compressed data file with header information retrieved from a message queuing data store based on a type of the industrial data to yield a compressed data packet, wherein the header information comprises at least a customer identifier associated with the industrial enterprise and priority information specifying a processing priority for the industrial data; and sending the compressed data packet to a cloud platform.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
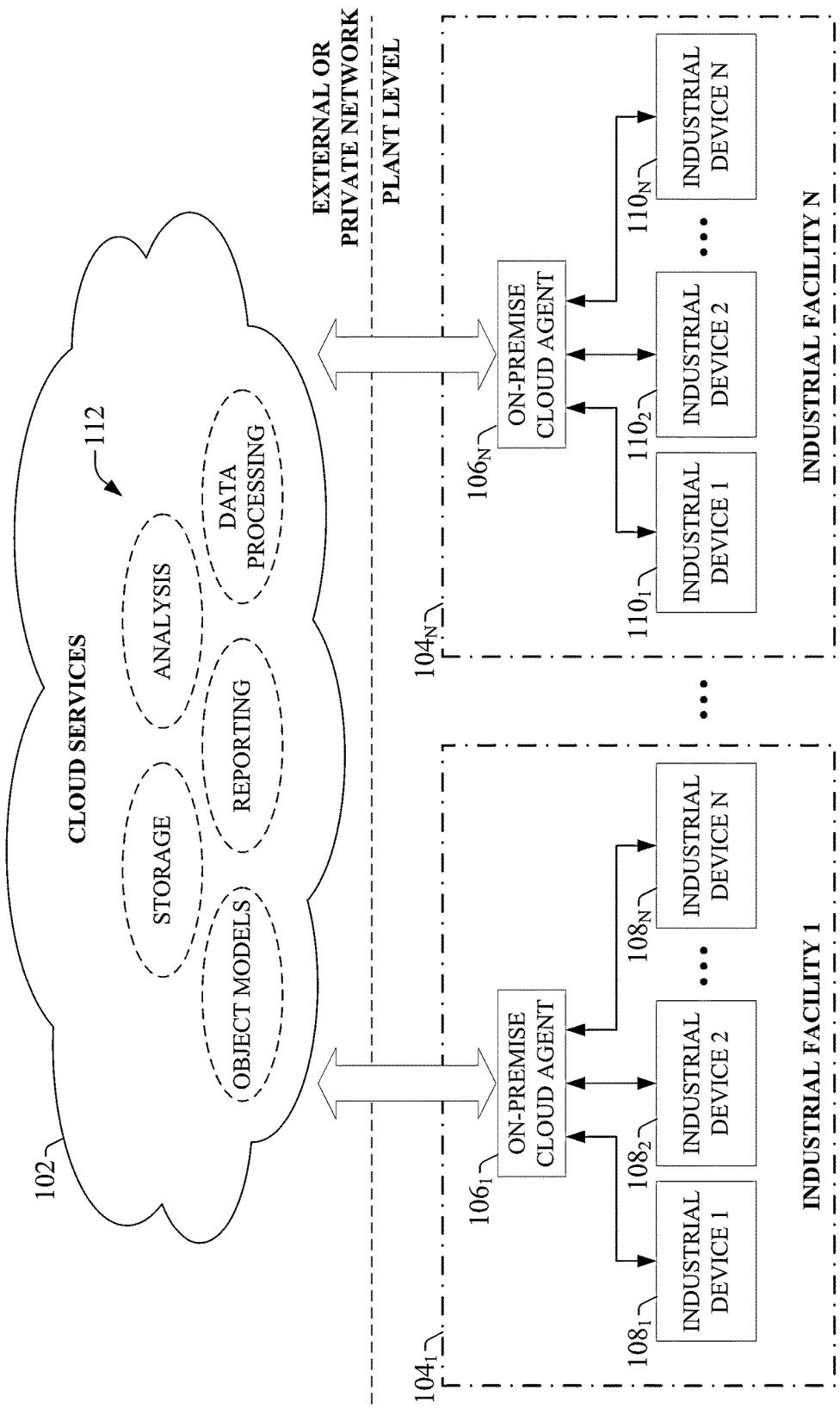
FIG. 1 is a high-level overview of an industrial enterprise that leverages cloud-based services.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such programming structures.

Because of the large number of system variables that must be monitored and controlled in near real-time, industrial automation systems often generate vast amounts of near real-time data. In addition to production statistics, data relating to machine health, alarm statuses, operator feedback (e.g., manually entered reason codes associated with a downtime condition), electrical or mechanical load over time, and the like are often monitored, and in some cases recorded, on a continuous basis. This data is generated by the many industrial devices that make up a typical automation system, including the industrial controller and its associated I/O, telemetry devices for near real-time metering, motion control devices (e.g., drives for controlling the motors that make up a motion system), visualization applications, lot traceability systems (e.g., barcode tracking), etc. Moreover, since many industrial facilities operate on a 24-hour basis, their associated automation systems can generate a vast amount of potentially useful data at high rates. The amount of generated automation data further increases as additional plant facilities are added to an industrial enterprise.

The large quantity of data generated by modern automation systems makes it possible to apply a broad range of plant analytics to the automation systems and processes that make up an industrial enterprise or business. However, access to the industrial data is typically limited to applications and devices that share a common network with the industrial controllers that collect and generate the data. As such, plant personnel wishing to leverage the industrial data generated by their systems in another application (e.g., a reporting or analysis tool, notification system, visualization application, backup data storage, etc.) are required to maintain such applications on-site using local resources. Moreover, although a given industrial enterprise may comprise multiple plant facilities at geographically diverse locations (or multiple mobile systems having variable locations), the scope of such applications is limited only to data available on controllers residing on the same local network as the application.

To address these and other issues, one or more embodiments of the present disclosure provide an on-premise agent architecture for collection of industrial data from plant-floor devices and transfer of the data to a cloud repository for processing and storage. This agent-based architecture can facilitate collection of industrial data from data sources at all levels of an industrial enterprise, including but not limited to industrial devices (e.g., controllers, drives, telemetry devices, etc.), data historians, data tables, business-level systems (e.g. enterprise resource planning systems, manufacturing execution systems, accounting systems, etc.), and other such data source. Cloud agents on the plant floor can send the collected data to a cloud-based infrastructure, which intelligently sorts and organizes the acquired data based on contextual and/or user-defined parameters (e.g., time of occurrence of a plant-floor event, priority, etc.).

The cloud agent architecture utilizes priority message queues and blob storage to decouple transmission of the collected data from processing and use of that data in the cloud platform. The cloud agents can also support torrential data streams and parallel pipes, resulting in high performance data transmission capability. Queue processing services package collected industrial data with customer-specific header information containing customer identification information, processing priority information specifying a relative priority for processing the data in the cloud platform (which may be based on a type of the data; e.g., historical, live, alarm, etc.), and other information that can be leveraged in the cloud platform to identify a type of processing to be performed on the data by the cloud platform's data process services.

FIG. 1 illustrates a high-level overview of an industrial enterprise that leverages cloud-based services. The enterprise comprises one or more industrial facilities 104, each having a number of industrial devices 108 and 110 in use. The industrial devices 108 and 110 can make up one or more automation systems operating within the respective facilities 104. Exemplary automation systems can include, but are not limited to, batch control systems (e.g., mixing systems), continuous control systems (e.g., PID control systems), or discrete control systems. Industrial devices 108 and 110 can include such devices as industrial controllers (e.g., programmable logic controllers or other types of programmable automation controllers); field devices such as sensors and meters; motor drives; operator interfaces (e.g., human-machine interfaces, industrial monitors, graphic terminals, message displays, etc.); industrial robots, barcode markers and readers; vision system devices (e.g., vision cameras); smart welders; or other such industrial devices.

Exemplary automation systems can include one or more industrial controllers that facilitate monitoring and control of their respective processes. The controllers exchange data with the field devices using native hardwired I/O or via a plant network such as Ethernet/IP, Data Highway Plus, ControlNet, DeviceNet, or the like. A given controller typically receives any combination of digital or analog signals from the field devices indicating a current state of the devices and their associated processes (e.g., temperature, position, part presence or absence, fluid level, etc.), and executes a user-defined control program that performs automated decision-making for the controlled processes based on the received signals. The controller then outputs appropriate digital and/or analog control signaling to the field devices in accordance with the decisions made by the control program. These outputs can include device actuation signals, temperature or position control signals, operational commands to a machining or material handling robot, mixer control signals, motion control signals, and the like. The control program can comprise any suitable type of code used to process input signals read into the controller and to control output signals generated by the controller, including but not limited to ladder logic, sequential function charts, function block diagrams, structured text, or other such platforms.

Although the exemplary overview illustrated in FIG. 1 depicts the industrial devices 108 and 110 as residing in fixed-location industrial facilities 104, the industrial devices 108 and 110 may also be part of a mobile control application, such as a system contained in a truck or other service vehicle.

According to one or more embodiments, on-premise cloud agents 106 can collect data from industrial devices 108 and 110—or from other data sources, including but not limited to data historians, business-level systems, etc.—and send this data to cloud platform 102 for processing and storage. Cloud platform 102 can be any infrastructure that allows cloud services 112 to be accessed and utilized by cloud-capable devices. Cloud platform 102 can be a public cloud accessible via the Internet by devices having Internet connectivity and appropriate authorizations to utilize the services 112. In some scenarios, cloud platform 102 can be provided by a cloud provider as a platform-as-a-service (PaaS), and the services 112 (such as the operator interface system described herein) can reside and execute on the cloud platform 102 as a cloud-based service. In some such configurations, access to the cloud platform 102 and the services 112 can be provided to customers as a subscription service by an owner of the services 112. Alternatively, cloud platform 102 can be a private or semi-private cloud operated internally by the enterprise, or a shared or corporate cloud environment. An exemplary private cloud can comprise a set of servers hosting the cloud services 112 and residing on a corporate network protected by a firewall.

Cloud services 112 can include, but are not limited to, data storage, data analysis, control applications (e.g., applications that can generate and deliver control instructions to industrial devices 108 and 110 based on analysis of real-time system data or other factors), visualization applications such as the cloud-based operator interface system described herein, reporting applications, Enterprise Resource Planning (ERP) applications, notification services, or other such applications. Cloud platform 102 may also include one or more object models to facilitate data ingestion and processing in the cloud. If cloud platform 102 is a web-based cloud, cloud agents 106 at the respective industrial facilities 104 may interact with cloud services 112 directly or via the Internet. In an exemplary configuration, the industrial devices 108 and 110 connect to the on-premise cloud agents 106 through a physical or wireless local area network or radio link. In another exemplary configuration, the industrial devices 108 and 110 may access the cloud platform 102 directly using integrated cloud agents. Cloud agents and their associated data collection and processing services are discussed in more detail below.

Ingestion of industrial device data in the cloud platform 102 through the use of cloud agents 106 can offer a number of advantages particular to industrial automation. For one, cloud-based storage offered by the cloud platform 102 can be easily scaled to accommodate the large quantities of data generated daily by an industrial enterprise. Moreover, multiple industrial facilities at different geographical locations can migrate their respective automation data to the cloud for aggregation, collation, collective analysis, visualization, and enterprise-level reporting without the need to establish a private network between the facilities. Cloud agents 106 ease the creation of Industrial Internet of Things (IoT). Cloud agents 106 can be configured to automatically detect and communicate with the cloud platform 102 upon installation at any facility, simplifying integration with existing cloud-based data storage, analysis, or reporting applications used by the enterprise. In another example application, cloud-based diagnostic applications can monitor the health of respective automation systems or their associated industrial devices across an entire plant, or across multiple industrial facilities that make up an enterprise. Cloud-based lot control applications can be used to track a unit of product through its stages of production and collect production data for each unit as it passes through each stage (e.g., barcode identifier, production statistics for each stage of production, quality test data, abnormal flags, etc.). Moreover, cloud based control applications can perform remote decision-making for a controlled industrial system based on data collected in the cloud from the industrial system, and issue control commands to the system via the cloud agent. These industrial cloud-computing applications are only intended to be exemplary, and the systems and methods described herein are not limited to these particular applications. The cloud platform 102 can allow software vendors to provide software as a service, removing the burden of software maintenance, upgrading, and backup from their customers.

Figure 2:
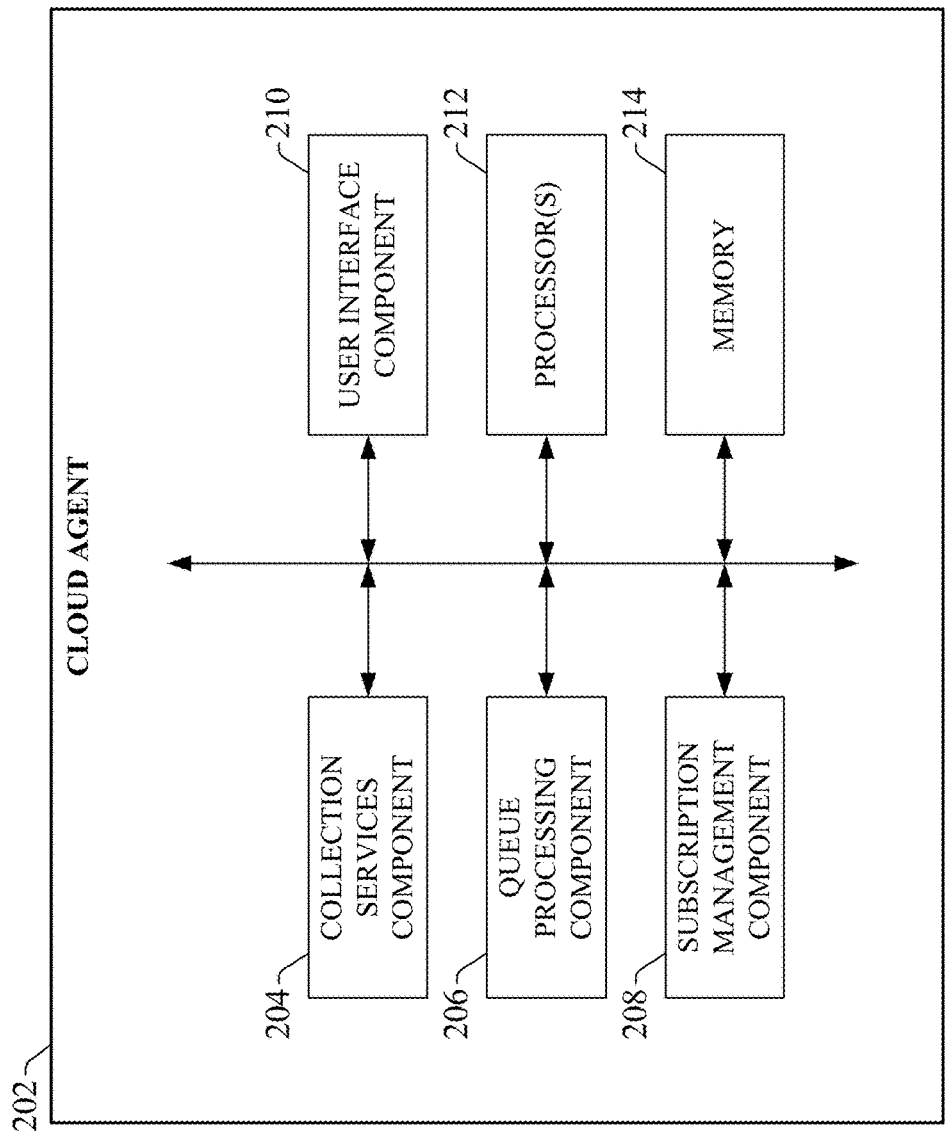
FIG. 2 is a block diagram of an example cloud agent.

FIG. 2 is a block diagram of an example cloud agent 202 according to one or more embodiments of this disclosure. Although FIG. 2 depicts certain functional components as residing on cloud agent 202, it is to be appreciated that one or more of the functional components illustrated in FIG. 2 may reside on a separate device relative to cloud agent 202 in some embodiments. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Cloud agent 202 can include a collection services component 204, a queue processing component 206, a subscription management component 208, a user interface component 210, one or more processors 212, and memory 214. In various embodiments, one or more of the collection services component 204, queue processing component 206, subscription management component 208, the one or more processors 212, and memory 214 can be electrically and/or communicatively coupled to one another to perform one or more of the functions of the cloud agent 202. In some embodiments, components 204, 206, 208, and 210 can comprise software instructions stored on memory 214 and executed by processor(s) 212. Cloud agent 202 may also interact with other hardware and/or software components not depicted in FIG. 2. For example, processor(s) 212 may interact with one or more external user interface devices, such as a keyboard, a mouse, a display monitor, a touchscreen, or other such interface devices.

Collection services component 204 can be configured to collect industrial device data, either from a data concentrator or directly from the devices themselves. Collection services component 204 can also be configured to pre-process the collected data for transmission to a cloud platform; e.g., by compressing the data and storing the data in a compressed data file. Queue processing component 206 can be configured to package a compressed data file prepared by the collection services component 204 into a data packet and push the data packet to the cloud platform. Subscription management component 208 can be configured to maintain customer-specific configuration and subscription information. This information can be accessed by the queue processing component 206 to determine how the compressed data file should be packaged, and how to connect to the customer's cloud platform for transmission of the data packets. User interface component 210 can be configured to receive user input and to render output to the user in any suitable format (e.g., visual, audio, tactile, etc.). In some embodiments, user interface component 210 can be configured to communicate with a graphical user interface that executes on a separate hardware device (e.g., a laptop computer, tablet computer, smart phone, etc.) communicatively connected to cloud agent 202. In such configurations, user interface component 210 can receive input parameter data entered by the user via the graphical user interface, and deliver output data (e.g., drive performance metric data) to the interface.

The one or more processors 212 can perform one or more of the functions described herein with reference to the systems and/or methods disclosed. Memory 214 can be a computer-readable storage medium storing computer-executable instructions and/or information for performing the functions described herein with reference to the systems and/or methods disclosed.

Figure 3:
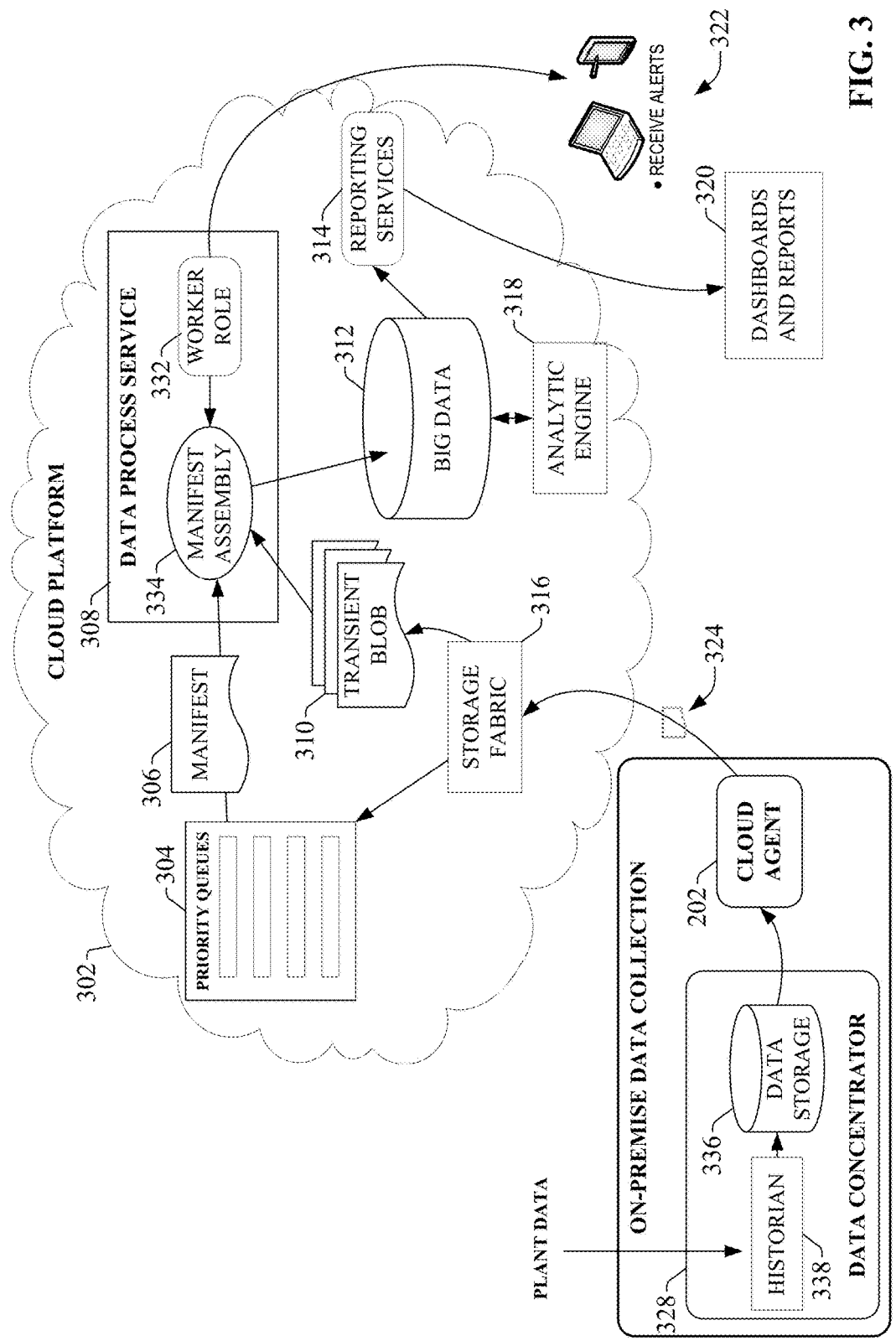
FIG. 3 is an overview of a system that leverages an agent-based cloud infrastructure to provide data collection and processing services to customer manufacturing sites.

FIG. 3 is an overview of a system that leverages an agent-based cloud infrastructure to provide data collection and processing services to customer manufacturing sites. This system can provide remote collection and monitoring services in connection with alarm and event notification for critical industrial assets, historical data collection, remote system access, system optimization, remote closed-loop control, and other such applications. The cloud-based infrastructure enables remote monitoring and reporting of on-premise assets by implementing six general areas of functionality—data ingestion into the cloud, data prioritization, object modeling, data processing, data analytics, and reporting.

In the example illustrated in FIG. 3 a data concentrator 328 collects plant data from one or more industrial assets (e.g., data generated by one or more industrial controllers, such as industrial devices 108 or 110) at a plant facility. These industrial assets can include industrial controllers that monitor and control industrial I/O devices, data servers and historians, motor drives, remote I/O interfaces that remotely interface groups of I/O devices to one or more of the industrial controllers, boilers or other industrial machines, or other such assets. For example, data concentrator 328 can monitor one or more controller tags defined in a tag archive and store data in local data storage 336 (e.g., a local structured query language, or SQL, server) associated with a historian 338. The collected data can include historical data (e.g., alarm history, status history, trend data, etc.), live data values read from the industrial assets, alarm data generated by the industrial assets, or other types of data.

An on-premise cloud agent 202 is configured to collect the live or historical data from the industrial assets, either directly or by accessing data storage 336 associated with data concentrator 228. Cloud agent 202 can execute on any suitable hardware platform (e.g., a server, a LINUX box, etc.), and acts as a generic gateway that collects data items from the various industrial assets on the plant network and packages the collected data according to a generic, uniform data packaging schema used to move the on-premise data to a cloud platform 302. Cloud agent 202 provides a software mechanism to dynamically link on-premise-to-cloud gateways. Cloud agent 202 provides an expandable data type schema that allows new data types to be added without the need to redeploy the monitoring system to the cloud.

During data collection, the cloud agent 202 can intelligently sort and organize the data based on defined criteria, including but not limited to time of occurrence and/or user-defined priorities. Cloud agent 202 can be, for example, a service (e.g., a Windows service) that periodically collects and transmits serialized and compressed data into the cloud domain using standard web services over HTTPS/SSL.

FIG. 3 depicts data concentrator 328 as the data source for cloud agent 202. This configuration can be useful if there are a large number of data points to monitor, since the data concentrator can 328 can link multiple industrial devices or other data sources to a single cloud agent 202. However, some embodiments of cloud agent 202 can collect data directly from the industrial assets themselves; e.g., through a common industrial protocol link, or through middleware applications such as OPC clients.

Figure 4:
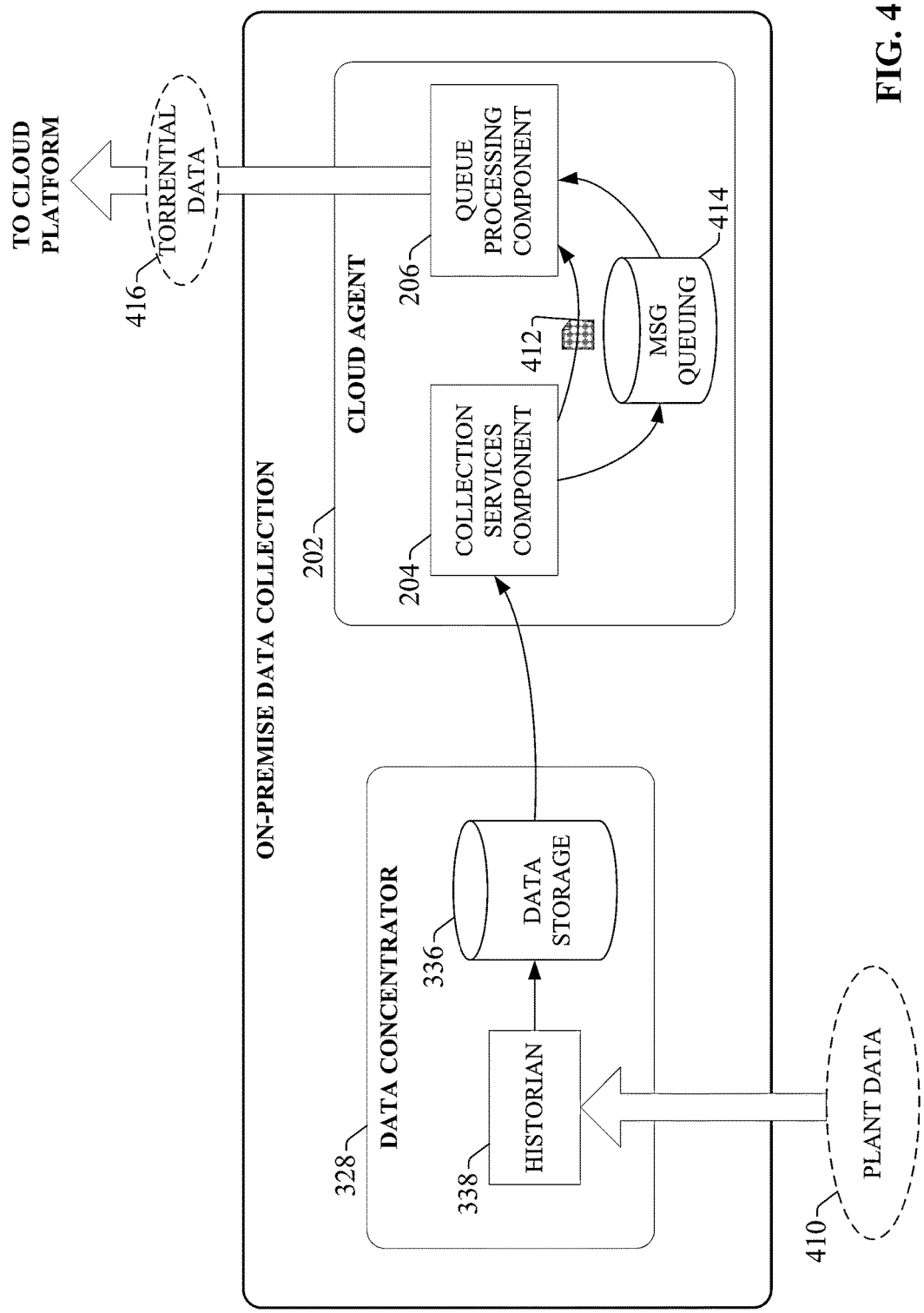
FIG. 4 is a block diagram illustrating on-premise data collection.

Cloud agent functionality is illustrated in more detail with reference to FIG. 4. On-premise data collection is enabled by a collection of services that function as a virtual support engineer for processing data. Data concentrator 328 and cloud agent 202 respectively implement two main functions associated with data collection—data concentration using a historian 338 and associated data storage 336 (e.g., an SQL server), and cloud data enablement using cloud agent services executed by cloud agent 202. As noted above, plant data 410 is collected by data concentrator 328 at the plant facility. In an example scenario, plant data 410 may comprise stamping press time series sensor data, made up of thousands of data points updated at a rate of less than a second.

Collection services component 204 of cloud agent 202 implements collection services that collect device data, either from data concentrator's associated data storage (e.g., via an SQL query) or directly from the devices themselves via a common industrial protocol (CIP) link or other suitable communication protocol. For example, to obtain data from data concentrator 328, collection services component 204 may periodically run a data extraction query (e.g., an SQL query) to extract data from data storage 336 associated with data concentrator 328. Collection services component 204 can then compress the data and store the data in a compressed data file 412. Queue processing services executed by queue processing component 206 can then read the compressed data file 412 and reference a message queuing database 414, which maintains and manage customer-specific data collection configuration information, as well as information relating to the customer's subscription to the cloud platform and associated cloud services. Based on configuration information in the message queuing database 414, queue processing component 206 packages the compressed data file 412 into a data packet and pushes the data packet to the cloud platform. In some embodiments, the cloud agent 202 can support injecting data packets as torrential data 416.

Message queuing database 414 can include site-specific information identifying the data items to be collected (e.g., data tag identifiers), user-defined processing priorities for the data tags, firewall settings that allow cloud agent 202 to communicate with the cloud platform through a plant firewall, and other such configuration information. Configuration information in message queuing database 414 instructs cloud agent 202 how to communicate with the identified data tags and with the remote data collection services on the cloud platform.

In addition to collection and migration of data, one or more embodiments of cloud agent 202 can also perform local analytics on the data prior to moving the data to the cloud platform. This can comprise substantially any type of pre-processing or data refinement that may facilitate efficient transfer of the data to the cloud, prepare the data for enhanced analysis in the cloud, reduce the amount of cloud storage required to store the data, or other such benefits. For example, cloud agent 202 may be configured to compress the collected data using any suitable data compression algorithm prior to migrating the data to the cloud platform. This can include detection and deletion of redundant data bits, truncation of precision bits, or other suitable compression operations. In another example, cloud agent 202 may be configured to aggregate data by combining related data from multiple sources. For example, data from multiple sensors measuring related aspects of an automation system can be identified and aggregated into a single cloud upload packet by cloud agent 202. Cloud agent 202 may also encrypt sensitive data prior to upload to the cloud. In yet another example, cloud agent 202 may filter the data according to any specified filtering criterion (e.g., filtering criteria defined in a filtering profile stored on the cloud agent). For example, defined filtering criteria may specify that pressure values exceeding a defined setpoint are to be filtered out prior to uploading the pressure values to the cloud.

In some embodiments, cloud agent 202 may also transform a specified subset of the industrial data from a first format to a second format in accordance with a requirement of a cloud-based analysis application. For example, a cloud-based reporting application may require measured values in ASCII format. Accordingly, cloud agent 202 can convert a selected subset of the gathered data from floating point format to ASCII prior to pushing the data to the cloud platform for storage and processing. Converting the raw data at the industrial device before uploading to the cloud, rather than requiring this transformation to be performed on the cloud, can reduce the amount of processing load on the cloud side.

Cloud agent 202 may also associate metadata with selected subsets of the data prior to migration to the cloud, thereby contextualizing the data within the industrial environment. For example, cloud agent 202 can tag selected subsets of the data with a time indicator specifying a time at which the data was generated, a quality indicator, a production area indicator specifying a production area within the industrial enterprise from which the data was collected, a machine or process state indicator specifying a state of a machine or process at the time the data was generated, a personnel identifier specifying an employee on duty at the time the data was generated, or other such contextual metadata. In this way, cloud agent 202 can perform layered processing of the collected data to generate meta-level knowledge that can subsequently be leveraged by cloud-based analysis tools to facilitate enhanced analysis of the data in view of a larger plant context.

To ensure secure outbound traffic to the cloud, one or more embodiments of cloud agent 202 can support HTTPS/SSL, certificate authority enabled transmission, and/or unique identity using MAC addresses. Cloud agent 202 can also support store-and-forward capability to ensure data is not lost if the agent becomes disconnected from the cloud.

Returning now to FIG. 3, cloud agent 202 sends compressed data packet 324 to the cloud-based data collection and monitoring system on cloud platform 302 via a cloud storage fabric 316. The data packet 324 conveys parameters and data (compressed and serialized) used by the cloud-side services to reconstruct the domain data structure in the cloud using auxiliary tenant-level manifests. The cloud services direct remote storage of the received data into preconditioned transient blobs 310. The cloud platform 302 can use agent reasoning and collective bargain features to determine a data storage locale.

Through the configuration interface provided by cloud agent 330, users at the plant facility can dynamically configure one or more priority queues 304 that respectively define how the data packets are processed in the cloud platform 302. For example, separate queues may be defined for alarms, live data, and historical data, allowing data to be organized according to these data types. The historical data queue can relate to time-series records, which can be accessed through an application programming interface (API) (e.g., an SQL API or other suitable API). The alarms queue can relate to abnormal situations, where the alarm data can also be accessed through the API. This alarms queue can comprise multiple queues associated with different alarm priorities, to allow for individual processing for different alarms having different levels of criticality. In some embodiments, servers, controllers, switches, etc., can be monitored using a number of protocols, and at a certain point (e.g., at the end of a monitoring cycle) alarms can be queued and cloud agent 202 can send the alarms to the cloud. Alarms can be reactive (e.g., alarms that trigger when a motor fails, when a CPU crashes, when an interlock is tripped, etc.) or proactive (e.g., a monitoring system may track consumables on a machine and generate an alarm when time to reorder, monitor cycle counts on a machine and generate an alarm when to schedule preventative maintenance, generate an alarm when temperatures fall outside defined bandwidths, send a notification when a computer's memory is 80% full, etc.).

The live data queue can relate to substantially real-time monitored data, such as current temperatures, current pressures, etc. The live data values can also be accessed through the API (e.g., a SQL API). The queues described above are not intended to be limiting, and it is to be appreciated that other types of priority queues can be defined according to the needs of the end user. For example, queues may be defined for specific devices or device types (e.g., motor drives) for uploading of device parameter and/or performance data.

In some embodiments, cloud agent 202 can allow the user to define these priority queues 304 from the on-site location and to define how data in each queue is handled. For example, the user can define, for each queue, an upload frequency, a priority level (e.g., which data queues should take processing priority over other data queues), identities of cloud partitions or databases in which data from the respective queues should be stored, and other such information. In an example scenario, the live data queue may be defined to process live data values that are to be used by a remote operator interface application to view substantially real-time data from the plant facility, while historical data queue may be used to process historian data for archival storage in a historical database on cloud storage. Accordingly, the live data queue may be assigned a higher priority relative to the historical data queue, since data in the live data queue is more time-critical than data in the historical queue.

Through cloud agent 202, users can assign priorities to respective data tags or tag groups at the customer site. These priority assignments can be stored in the message queuing database 414 of the cloud agent 202. Accordingly, when queue processing component 206 packages the collected data to be moved to the cloud platform, the collected data items can be packaged into data packets according to priority (as defined in message queuing database 414), and the respective data packet headers populated with the appropriate priority level. If access to the cloud is unavailable, data will continue to be collected by collection services component 204 and stored locally on the cloud agent in local storage associated with collections services. When communication to the cloud is restored, the stored data will be forwarded to cloud storage. Queue processing services can also encrypt and send storage account keys to the cloud platform for user verification.

When cloud agent 202 sends a data packet to the cloud-based remote processing service, the service reads the packet's header information to determine a priority assigned to the data (e.g., as defined in a data priority field of the data packet) and sends the data packet (or the compressed data therein) to a selected one of the user defined priority queues 304 based on the priority. On the other side of the priority queues 304, a data process service 308 processes data in the respective priority queues 304 according to the predefined processing definitions. The data processing service includes a worker role 332 that determines how the queued data is to be processed based on manifests (e.g., system manifests, tag manifests, and metric manifests) stored in a customer-specific manifest assembly 334. Manifests define and implement customer-specific capabilities, applications, and preferences for processing collected data in the cloud. Manifests can be dynamically uploaded by a user at the plant facility through cloud agent 202, which facilitates dynamic extension of cloud computing capability.

For example, if new data points are to be added to the data collection system that require creation of a new data queue, the user can interact with cloud agent 202 to configure a new manifest for the new queue, the manifest defining such aspects as processing priority for the data, upload frequency for the data, where the data is to be routed or stored within cloud storage, and other such information. Cloud agent 202 can then upload the new manifest 306 together with the data (or independently of the data). The new manifest 306 is then added to the customer's manifest assembly 334 with the other manifests defined for the customer, so that worker role 332 can leverage the new manifest 306 to determine how data in the new queue is to be processed. This new manifest 306 need only be uploaded to the cloud-based remote monitoring service once. Thereafter, data placed in the new priority queue will be processed by worker role 332 according to the new manifest 306 stored in the customer's manifest assembly 334. For example, the manifest may define where the data is to be stored within cloud storage (e.g., in a historical database, and Alarms and Live Data database, big data storage 312, etc.), and whether processing of the new data queue is to take priority over other data queues. In some embodiments, the manifest assembly 334 may only accept a new manifest if the manifest is accompanied by a unique key associated with the client.

Once the cloud-based remote monitoring infrastructure has processed and stored the data provided by cloud agent 202 according to the techniques described above, the data can be made accessible to client devices 322 for viewing. Data analysis on the cloud platform 302 can provide a set of web-based and browser enabled technologies for retrieving, directing, and uncompressing the data from the cloud platform 302 to the client devices 322. To this end, reporting services 314 can deliver data in cloud storage (e.g., from the big data storage 312) to the client devices 322 in a defined format. For example, reporting services 314 can leverage collected data stored in the cloud repository to provide remote operator interfaces to client devices 322 over the Internet. An analytic engine 318 executing on the cloud platform 302 can also perform various types of analysis on the data stored in big data storage 312 and provide results to client devices 322.

Figure 5:
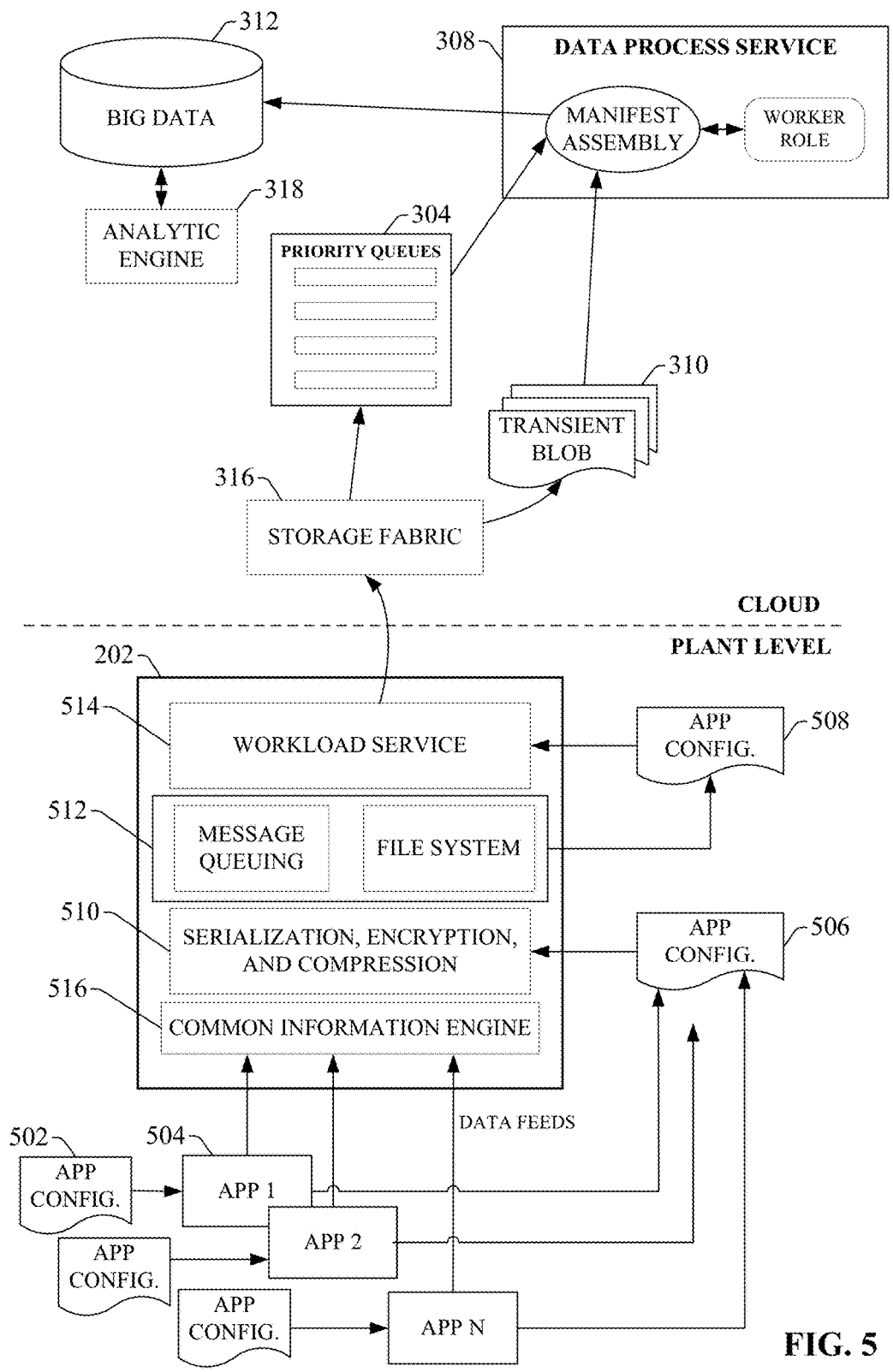
FIG. 5 is a block diagram illustrating a logical architecture of the services carried out by cloud agent.

FIG. 5 is a block diagram illustrating a logical architecture of the services carried out by cloud agent 202. In this example, a number of data collection applications 504 are configured to collect data from respective industrial assets or groups of assets. Data collection applications 504 can execute on suitable hardware devices (e.g., data collection servers or other such devices), and serve as data sources for cloud agent 202. Each data collection application 504 is configured with respective application configurations 502, which define data source parameters that instruct the respective data collection applications 504 how to connect to the devices and applications from which data is to be retrieved. The application configurations 502 can also include configuration data required by the data collection applications 504 to connect to the specified devices and applications. Using the configuration information provided by application configurations 502, the respective data collection applications 504 are able to establish a connection to the specified devices and applications, and retrieve data from specified data tags or elements associated with the various devices and applications. The application configurations also instruct the data collection applications 504 how to prepare the retrieved data for collection by cloud agent 202.

Once the data collection applications 504 have been configured and are in the process of collecting data from their assigned industrial devices and applications, each data collection application 504 can provide its collected data to cloud agent 202 via respective data feeds. Each data collection application 504 may be communicatively linked to cloud agent 202 over a plant or office network (e.g., Ethernet, Common Industrial Protocol, etc.), or over a wireless link (e.g., a wireless local area network, a radio link, etc.). In some embodiments, the data collection applications 504 may be configured to push their collected data to the cloud agent 202 periodically or in response to defined upload triggers (e.g., in response to a defined amount of data being collected). In other embodiments, cloud agent 202 may periodically extract the collected data from each data collection application 504. In such embodiments, the cloud agent 202 may periodically run a data extraction query (e.g., an SQL query) that retrieves the data from the respective data collection applications 504.

Figure 6:
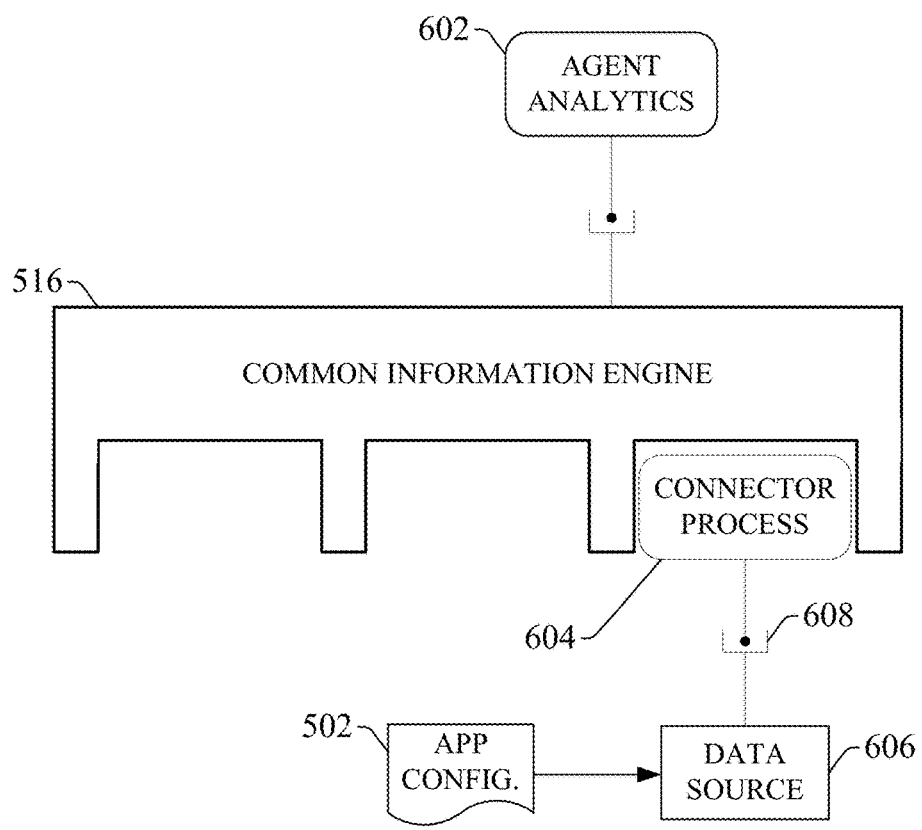
FIG. 6 is a conceptual block diagram of a common information engine.

In some embodiments, cloud agent 202 may communicate with the data collection applications 504 using a common information engine 516, which serves as a symmetric information exchange interface for the agent. Common information engine 516 can support multiple communication protocols (e.g., representational state transfer, data distribution service (DDS), WebSocket, etc.) for communicating with the various data collection applications 504, and serves as a concurrent parallel process engine to manage multi-threaded connectors to the data collection applications 504. Turning briefly to FIG. 6, a conceptual block diagram of a common information engine 516 is illustrated. When a new data collection application or other new data source—e.g., data source 606—is to be added to the cloud agent 202, the common information engine 516 instantiates an agent analytics component 602 for the new connection. The agent analytics component 602 manages data extraction from the data source 606 via a service interface. The instantiated agent analytics component 602 invokes connector process 604 for the new data source 606 via the common information engine 516. Connector process 604 is a specialized execution script that creates and manages service interface connections to a target adapter associated with the new data source 606. Common information engine 516 can support multiple communication protocols. As such, the agent analytics component 602 can generate a suitable connector process 604 that supports the protocol used by the target adapter (e.g., CIP for a common industrial protocol adaptor; object linking and embedding for a data historians that support OLE, etc.). The target adapter may have an associated communication port 608—e.g., a representational state transfer (REST) connector, a WebSocket, etc.—through which the connector process 604 establishes a communication channel with the data source 606. Connector process 604 then extracts the data from data source 606 via the communication channel. The data locations within data source 606 (e.g., data tags, registers, etc.) from which data is to be extracted can be defined by application configuration 502 applied to data source 606 (as described above in connection with FIG. 5).

Retuning now to FIG. 5, the data received from the data collection applications 504 (via respective connector processes 604) is prepared for transmission to the cloud using native cloud agent services. In particular, serialization, encryption, and compression services 510 executing on cloud agent 202 (which may be implemented by collection services component 204) pre-process the data in accordance with user-defined preferences defined by application configuration 506. For example, application configuration 506 may define a preferred type of compression and/or encryption to be applied to the received data prior to injecting the data to the cloud platform. Application configuration 506 can be applied to cloud agent 202 via a user interface (not shown) that allows a user to enter or select configuration parameters for the cloud agent. Services 510 encrypt and compress the extracted data to yield a compressed data file (e.g., compressed data file 412 shown in FIG. 4).

Figure 7:
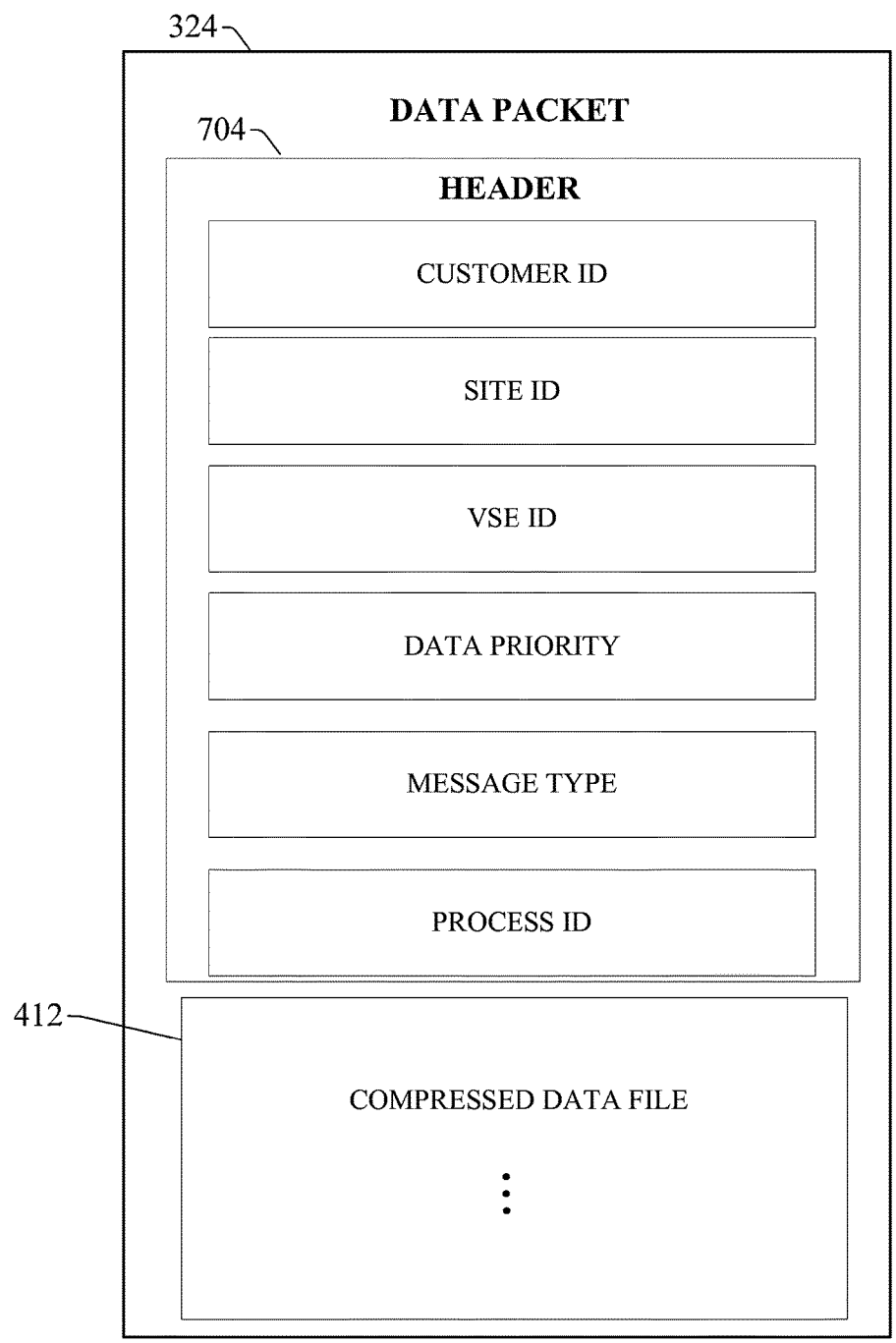
FIG. 7 is a diagram of an example compressed data packet.

Message queuing services of buffering layer 512 (which can be implemented by queue processing component 206) then encapsulates or packages the compressed data file by adding customer-specific header information to yield a compressed data packed (e.g., compressed data packet 324 of FIG. 3). For example, the message queuing services can access a message queuing database (e.g., message queuing database 414 of FIG. 4), which stores customer site configuration information and manages the customer's subscription to the cloud platform services. The message queuing database may include such information as a customer identifier associated with the customer entity associated with the industrial enterprise, a site identifier associated with a particular plant facility from which the data was collected, a priority to be assigned to the data (which may be dependent on the type of information being sent; e.g., alarm data, historical data, live operational data, etc.), information required to facilitate connection to the customer's particular cloud fabric, or other such information. The information included in the header is based on this customer-specific information maintained in the message queuing database. An example compressed data packet is illustrated in FIG. 7. As shown, the cloud agent's message queuing services add a header 704 to compressed data file 412 to yield the compressed data packet 324. The header 704 contains customer-specific data read from message queuing database 414. For example, header 704 can include a unique customer identifier, a site identifier representing a particular plant facility, a virtual support engineer identifier, a data priority for the data in the compressed data file 412, a message type, and a process identifier that specifies a particular manifest application on the cloud platform that should be used to process the data on the cloud side. Packaging the data in this way can allow data from diverse data sources to be packaged together using a uniform, generic data packaging schema so that the data can be moved to the cloud infrastructure.

Returning now to FIG. 5, buffering layer 512 of cloud agent 202 can temporarily store the compressed data packet prior to transmission to the cloud platform. For example, the buffering layer 512 may utilize the message queuing services and a file system to temporarily queue the compressed data file prior to transmission. These queuing services allow the cloud agent 202 to support store-and-forward capabilities, such that data retrieved from the data sources can be stored locally on the cloud agent 202 until a communication channel to the cloud platform is available.

Once the compressed data file has been encapsulated and queued in the cloud agent, connector process 604 notifies agent analytics component 602 that the data extraction has completed. In response, the instantiated analytics agent component 602 requests a directory service function to create a cloud connector port that serves as a communication channel between the cloud agent 202 and the cloud platform. In response, a workload service 514 executing on the cloud agent 202 opens a channel to the cloud storage fabric 316. Attributes of the channel can be set by an application configuration 508 applied to the workload service 514. Similar to application configuration 506 used to set user-defined parameters for the serialization, encryption, and compression service, application configuration 508 can be applied to workload service 514 via a user interface or dashboard that allows a user to enter or select attribute settings for the service. For example, if the cloud agent utilizes REST to communicate with the cloud platform, application configuration 508 may be used to set attributes for the REST application programming interface (API) generated by the workload service.

Figure 8:
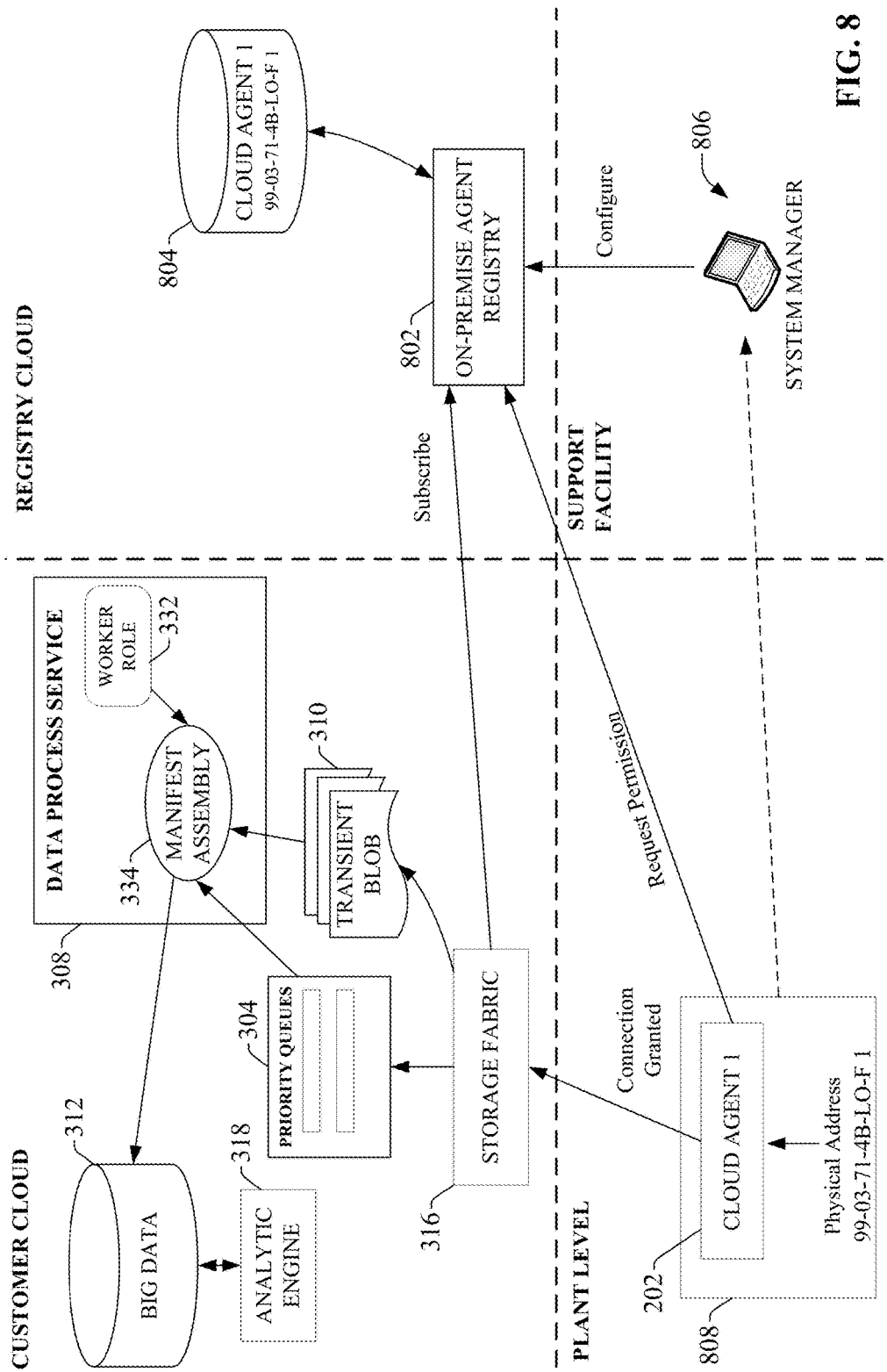
FIG. 8 is a block diagram of an example architecture that utilizes an agent registry to manage agent communication to a customer's cloud platform.

In one or more embodiments, communication channels between the workload service 514 of cloud agent 202 and the cloud platform can be managed by an agent registry in the cloud. FIG. 8 is a block diagram of an example architecture that utilizes an agent registry to manage agent communication to a customer's cloud platform. In this example, an on-premise agent registry 802 resides on the same cloud space as the customer cloud, but on a separate registry cloud. The registry cloud and the agent registry 802 may be managed by a service provider that offers the customer use of the customer cloud platform as a PaaS (platform as a service). The agent registry 802 can enforce secure access to the customer cloud platform and ensure that the customer's collected data in the cloud platform is only accessed by authenticated devices and users. When a new customer cloud platform is established as part of a PaaS agreement, the new customer cloud platform can be subscribed to the agent registry 802 so that agent communication with the new cloud platform can be regulated by the registry.

Cloud agent 202 may be one of several cloud agents distributed throughout the customer's industrial enterprise. In the example depicted in FIG. 8, cloud agent 202 is identified as Cloud Agent 1 to distinguish the agent from other on-premise agents. Cloud agent 202 executes on computing device 808, which may be a server, a LINUX box, or other hardware platform. Computing device 808 has a physical address (e.g., a MAC address or other physical address) that uniquely identifies the computing device. Agent registry 802 stores a record of cloud agent 202 in association with the physical address of computing device 808 (99-03-71-4B-LO-F 1 in the present example), so that Cloud Agent 1 and the physical device on which the agent executes are logically linked. This association between Cloud Agent 1 and the physical address of computing device 808 may be entered into the agent registry 802 by a system manager 806 at a support facility associated with the cloud service provider. System manager 806 may also enter other configuration parameters that will be used by the agent registry to manage secure connections to the customer's cloud platform. Configuration information for managing the agent's connectivity to the cloud platform can be maintained in registry storage 804 on the registry cloud.

When cloud agent 202 has encapsulated and queued a compressed data file as described above and connector process 604 has notified the agent analytics component 602 that data extraction has completed, agent analytics agent 602 can send a request to agent registry 802 for permission to create a cloud connector port that will serve as a communication channel between the cloud agent 202 and the cloud platform. The request can include, for example, an identification of Cloud Agent 1, the physical address of computing device 808, and an identification of the particular customer-specific cloud platform to which the connection is requested. The agent registry 802 will grant or deny a certificate to the agent for establishing the channel based on information provided in the agent request. For example, the agent registry 802 may reference registry storage 804 to confirm that the physical address of the computing device 808 from which the request was received is associated with the particular cloud agent (Cloud Agent 1) requesting the channel. By confirming that the connection request for Cloud Agent 1 has been received from the previously registered computing device 808, the agent registry ensures that Cloud Agent 1 cannot be used to establish connectivity to the cloud platform if improperly moved or copied to another physical device. If Cloud Agent 1 is moved to a different computing device without registering the new device with agent registry 802, the registry will deny any communication requests originating from the new device on behalf of the agent.

When the agent registry 802 determines that the connection request is valid (based on information received in the request and previously registered information for Cloud Agent 1 in registry storage 804), the agent registry 802 grants a certificate to the cloud agent 202 permitting the agent to open a temporary communication channel to the customer cloud platform. Accordingly, a cloud API managed by workload service 514 (e.g., a REST API) establishes a communication channel to the cloud platform and sends the compressed data file to the cloud platform for storage and processing as described above in connection with FIG. 3. In one or more embodiments, the workload service assigns an expiration time to the communication channel when the channel is created. The expiration time may be defined by the service providers via agent registry 802 or by the end user via application configuration 508 applied to the workload service on the customer end. Typically, the expiration time will be set to exceed an expected duration of time required to send the compressed data packets. If the cloud agent 202 has completed transfer of the compressed data packet to the cloud platform before the expiration time for the channel has elapsed, the channel will automatically close upon completion of the data transfer or when the expiration time has elapsed. If the cloud agent 202 has not completed transfer of the compressed data packets to the cloud platform by the time the expiration time has elapsed, the cloud agent 202 may perform additional handshaking with the agent registry 802 requesting re-enablement of the channel to allow completion of the data transfer.

Figure 9:
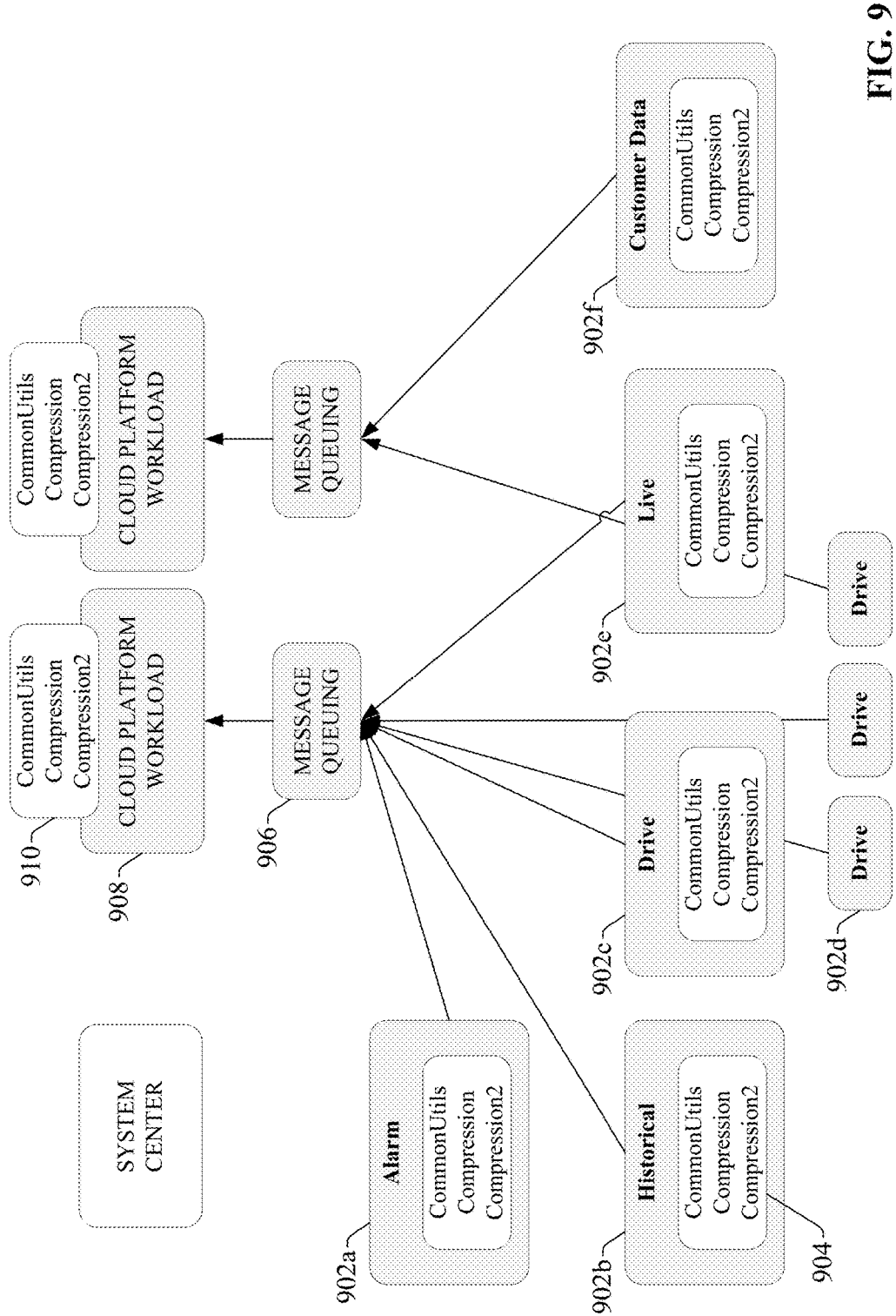
FIG. 9 is a block diagram of an example agent architecture for collection of data from on-premise industrial devices.

FIG. 9 is a block diagram illustrating an example agent architecture for collection of data from on-premise industrial devices according to one or more embodiments. In this example, data is collected from a number of devices and applications 902 at the customer site, including an alarm database 902a, data historian 902b, motor drives 902c and 902d, live data server 902e, and a customer database 902f. Although these data sources comprise a diverse, heterogeneous collection of devices and applications, collection and pre-processing of data from these sources can be carried out by generic services 904 (e.g., service libraries). Generic services 904 can include utilities for identifying the data locations (e.g., devices, applications, tags, registers, etc.) from which data is to be retrieved, utilities for compressing or otherwise pre-processing the data, and providing the data to the message queuing layers 906 of the cloud agents (as described above in connection with buffering layer 512 of FIG. 5). The workload services 908 of the cloud agents can also utilize generic services 910 to encapsulate and send the data to the cloud fabric. The message queuing layers 906 and workload services 908 make up the backbone of the decoupled agent architecture.

Figure 10:
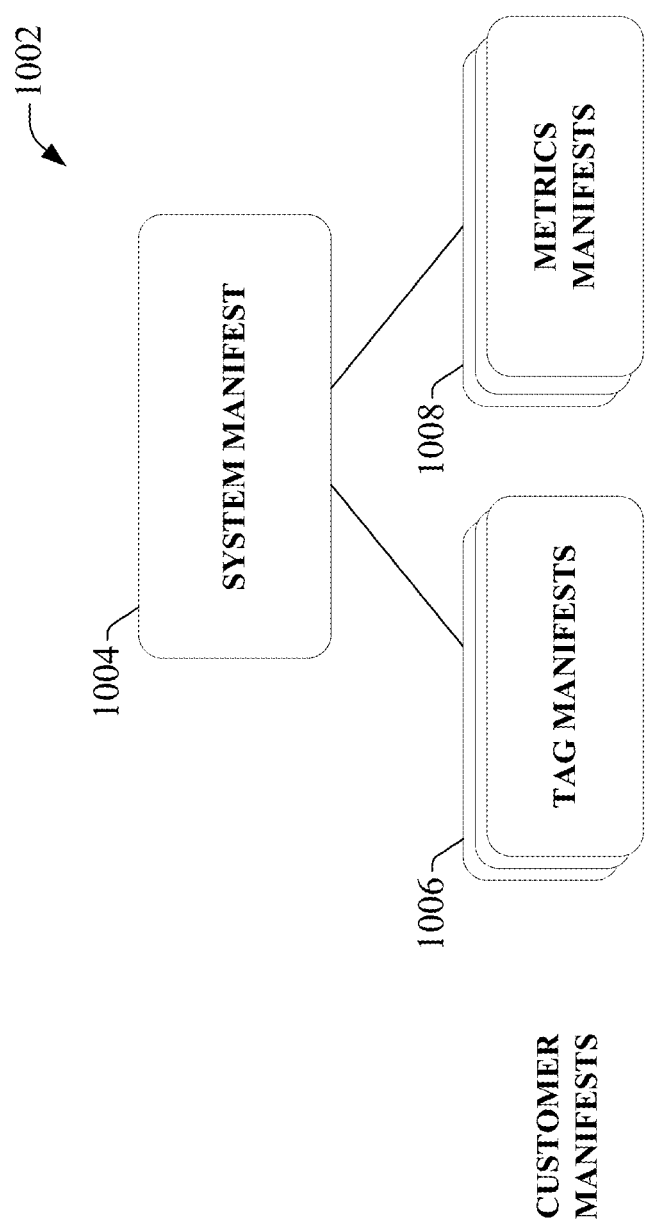
FIG. 10 is a conceptual diagram of an example manifest assembly.

Since the cloud agent 202 encapsulates the on-premise data collected from data collection applications 504 into envelopes containing customer-specific and application-specific information, the compressed data packets convey the parameters and data required by the cloud to identify the appropriate manifest stored in the customer's manifest assembly (e.g., manifest assembly 334) for handling, processing, and/or routing of the data contained in the compressed data file. FIG. 10 is a conceptual diagram of an example manifest assembly 1002. In this example, a system manifest 1004 maintained in manifest assembly 334 can include links to application-specific customer manifests. Customer manifests can comprise tag manifests 1006 and metrics manifest 1008. When a compressed data packet (e.g., compressed data packet 324 of FIG. 7) is received at the cloud platform from a cloud agent, data process service 308 uses information packaged in the header 704 of the packet to identify the appropriate metrics manifest and tag manifest for processing the data contained in the compressed data file 412. A worker role (e.g., worker role 332 of FIG. 3) loads the identified metrics and tag manifests, which are then executed on the received data. In general, the metrics manifest identifies one or more generic procedures that can be retrieved and executed on the data, as well as application-specific ranges, coefficients, and thresholds that may be passed to the retrieved procedures. The tag manifest identifies tag names used to map the data items in the compressed data file to variables or tags defined in the retrieved generic procedures.

Figure 11:
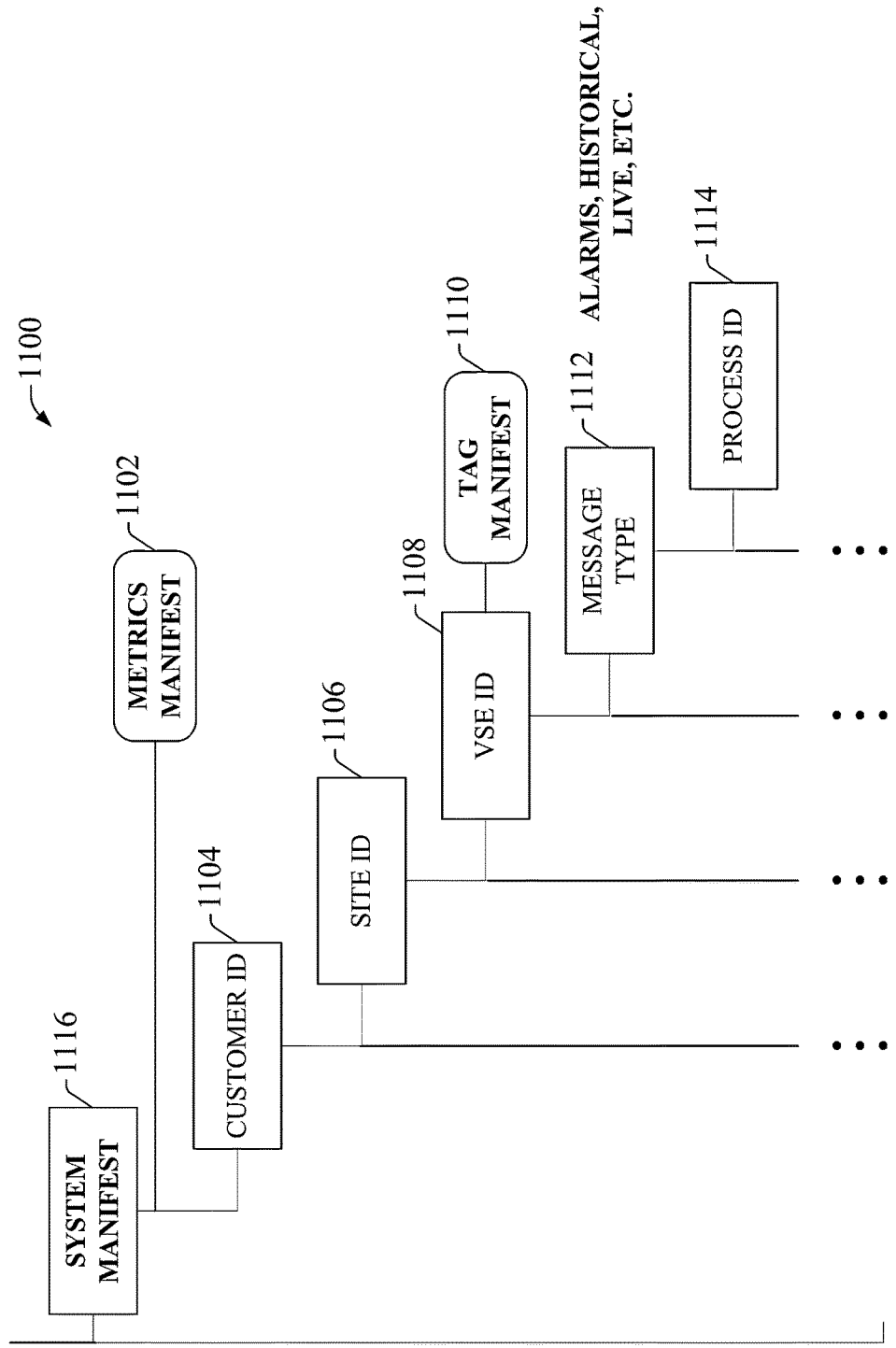
FIG. 11 is a diagram of an example hierarchical architecture for a system manifest.

FIG. 11 illustrates an example hierarchical architecture 1100 for the system manifest according to one or more embodiments. An example system manifest 1116 maintained on the cloud platform in manifest assembly 334 can be organized into multiple hierarchical levels. Each individual customer entity that will access the manifest assembly for processing of on-premise data can be defined under a customer identifier level 1104. Since each customer entity may operate multiple plant facilities or sites, one or more site identifier nodes are defined for each customer identifier node on a site identifier level 1106. For each defined site, one or more virtual support engineer (VSE) nodes are defined on a VSE identifier level 1108. A message type level 1112 and a process identifier level 1114 are defined under the VSE identifier level 1108.

The hierarchical levels that make up the logical architecture of the system manifest describes a hierarchical relationship between sets of on-premise industrial data collected from various data sources across an industrial enterprise. Note that the hierarchical levels of the example manifest depicted in FIG. 11 correspond to data fields included in header 704 of compressed data packet 324 (see FIG. 7). Thus, when an on-premise cloud agent sends a compressed data packet to the cloud platform, data process service 308 on the cloud platform leverages the information contained in the header to navigate the manifest's hierarchical architecture 1100 to identify the manifest assembly (metrics manifest and tag manifest) to be executed on the data contained in compressed data file 412.

In the example illustrated in FIG. 11, the metrics manifest 1102 is invoked when a compressed data packet is received by the cloud-based system. The metrics manifest 1102 defines one or more metrics (identified by the process identifier field of the compressed data packet header) that can be carried out on the data, and in particular defines the coefficients, thresholds, and ranges to be used for each identified metric. Each metric (process) corresponds to a generic procedure stored on the cloud platform in association with the manifest assembly 334.

To determine which metrics to apply to the received data, worker role 332 (see FIG. 3) uses the customer identifier, site identifier, and VSE identifier fields of header 704 to navigate the corresponding levels of the manifest hierarchy to identify the appropriate tag manifest 1110. The tag manifest 1110 identifies tag names used to map data items in the data file to the one or more metrics (processes) that will operate on the data. The tag manifest 1110 also identifies which process identifiers have ownership over each tag name. The particular process that will be executed on the data is identified by the message type and process identifier fields of the header 704. In this regard, the system manifest may define multiple message types (e.g., alarms, historical data, live data, etc.), and, for each defined message type, define one or more namespaces corresponding to a given process identifier. The namespaces identify corresponding applications stored in association with the manifest assembly that can be loaded by worker role 332 and executed on the data contained in the encapsulated data file. These applications may specify a final destination for the data (e.g., big data storage, one or more specified client devices, a visualization application, etc.), or may comprise algorithms or computational procedures to be carried out on the data to yield a desired result (e.g., a net power calculation, an efficiency calculation, a power guarantee calculation, etc.).

By this architecture, the worker role in the cloud platform will load the appropriate manifest assembly for processing a received data packet based on the customer from which the data was received, as well as other data attributes—such as the customer facility or site, the type of data (e.g., alarm data, historian data, live data from industrial devices, etc.), a specified process or metric, etc.—identified by the header of the compressed data packet. By encapsulating collected data on the plant floor to include these attributes prior to sending the data to the cloud, the cloud agent effectively applies a customer-specific model to the data that describes the data's context within the plant hierarchy, as well as the data's relationship to other data items across the enterprise. This information can then be leveraged on the cloud side to appropriately handle and process the data based on the data's role in the larger enterprise as well as user-defined processing and storage preferences.

FIGS. 12-15 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 12:
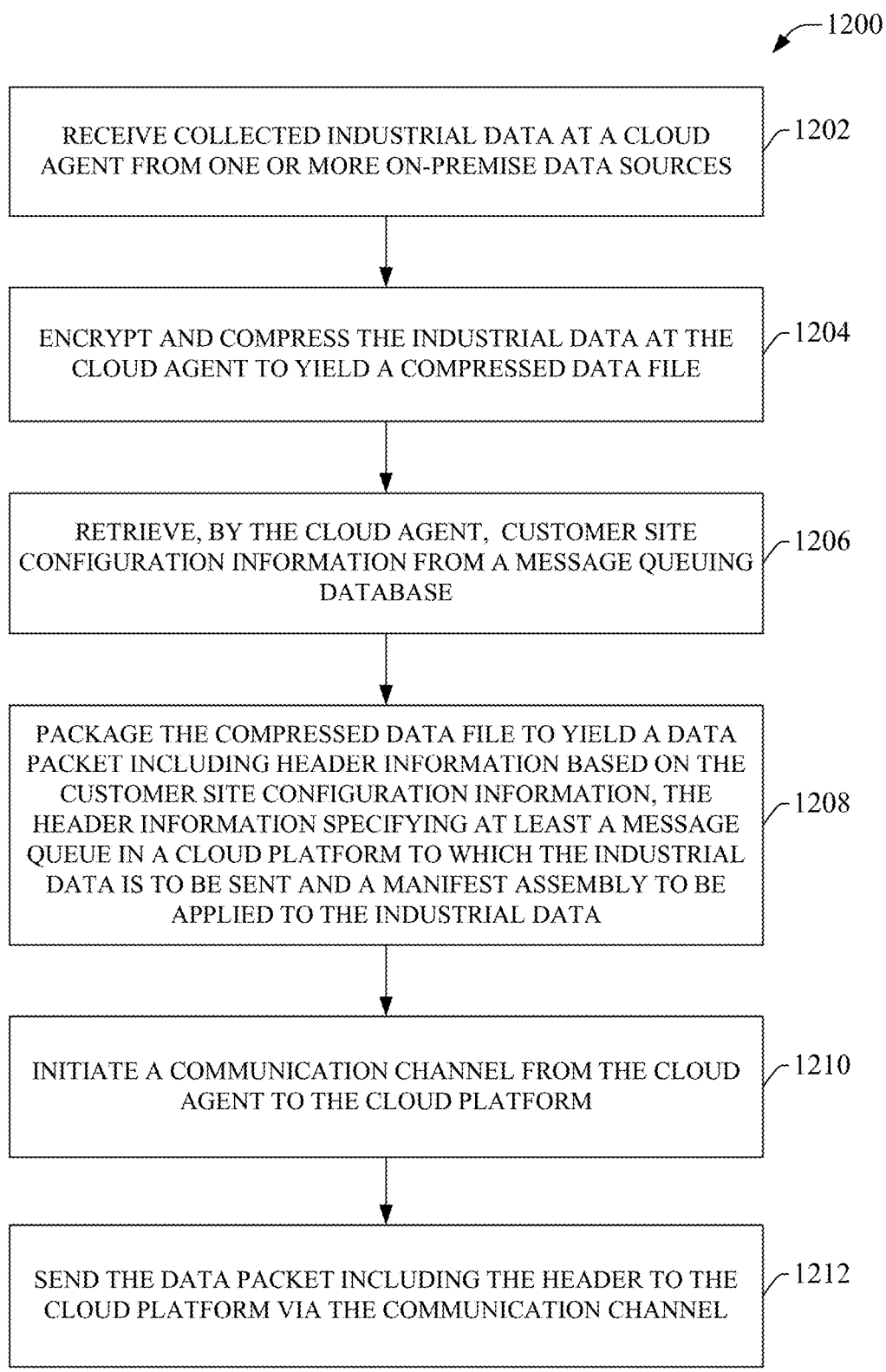
FIG. 12 is a flowchart of an example methodology for ingesting industrial data to a cloud platform using a cloud agent architecture.

FIG. 12 illustrates an example methodology 1200 for ingesting industrial data to a cloud platform using a cloud agent architecture. Initially, at 1202, collected industrial data form one or more on-premise data sources is received at a cloud agent. The data sources may be, for example, data collection systems that collect data from one or more industrial devices (e.g., industrial controllers, motor drives, telemetry devices, etc.). The cloud agent may also receive the industrial data directly from the industrial devices themselves via suitable communication links to those devices. At 1204, the industrial data is encrypted and compressed at the cloud agent to yield a compressed data file. At 1206, customer site configuration information is retrieved from a message queuing database associated with the cloud agent. The customer site configuration information can include, for example, a customer identifier associated with the customer entity associated with the industrial enterprise, a site identifier associated with a particular plant facility from which the data was collected, a priority to be assigned to the data (which may be dependent on the type of information being sent; e.g., alarm data, historical data, live operational data, etc.), information required to facilitate connection to the customer's particular cloud storage fabric, or other such information.

At 1208, the compressed data file created at step 1204 is packaged by the cloud agent to yield a data packet. The cloud agent packages the data packet to include header information generated based on the customer site configuration information retrieved at step 1206. The header information can include, for example, information specifying at least a message queue in a cloud platform to which the industrial data is to be sent and a manifest assembly to be applied to the industrial data in the cloud platform. At 1210, a communication channel is initiated from the cloud agent to the cloud platform. At 1212, the data packet, including the header, is sent to the cloud platform via the communication channel. Data process services in the cloud platform will place the data in a priority queue selected based on the header information and process the data using the identified manifest assembly.

Figure 13:
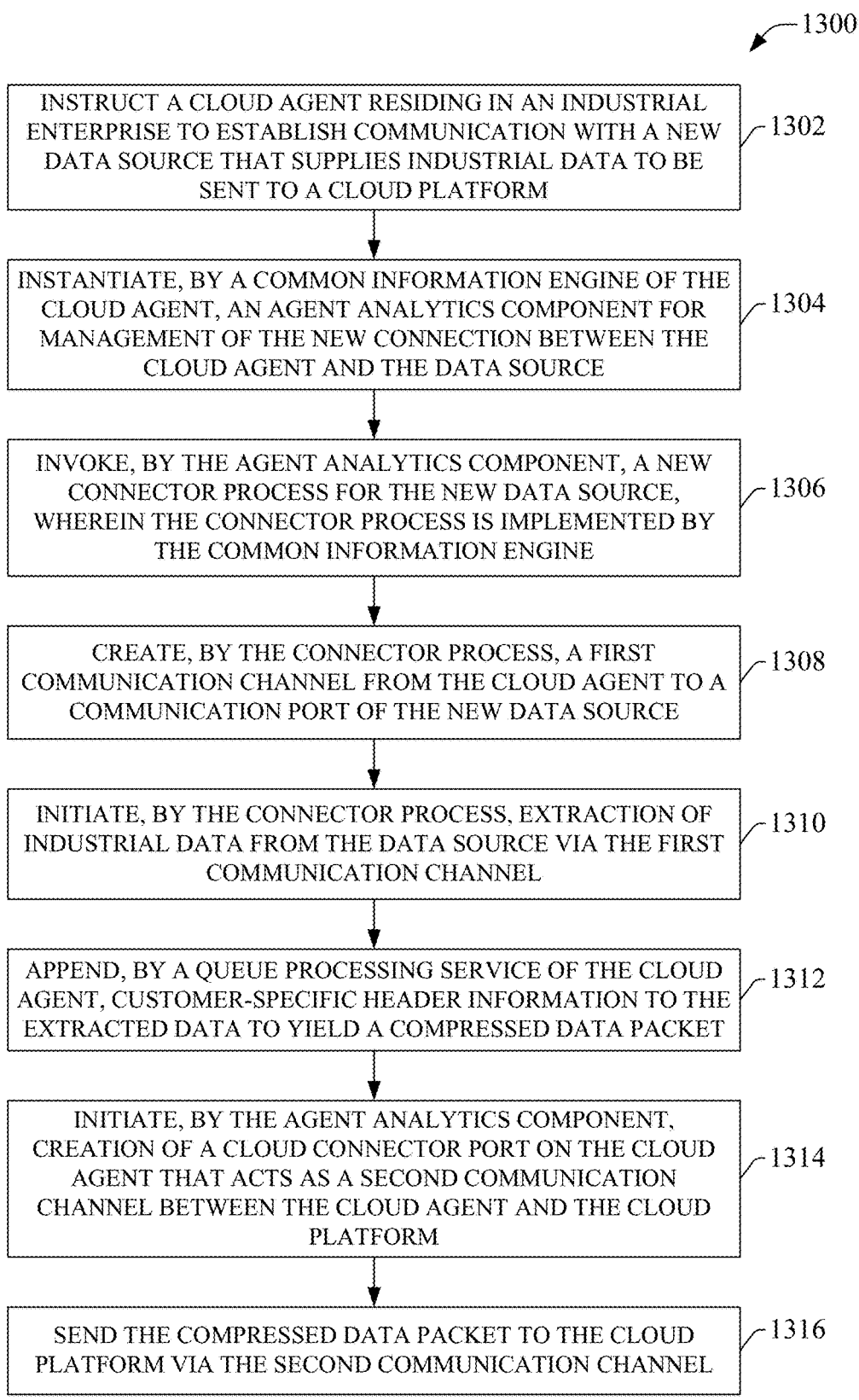
FIG. 13 is a flowchart of an example methodology for collecting data from an industrial enterprise and sending the data to a cloud platform using cloud agent services.

FIG. 13 illustrates an example methodology 1300 for collecting data from an industrial enterprise and sending the data to a cloud platform using cloud agent services. Initially, at 1302, a cloud agent residing in an industrial enterprise is instructed to establish communication with a newly added data source that is to supply industrial data to a cloud platform for customer-specific processing. At 1304, a common information engine of the cloud agent instantiates an agent analytics component for management of the new connection between the cloud agent and the new data source. At 1306, the agent analytics component invokes a new connector process for the new data source. The connector process is implemented by the common information engine, and comprises a specialized execution script that creates and manages a service interface connection to a target adapter associated with the new data source. The common information engine can create the connector process to support the particular communication protocol used by the data source's target adapter (e.g., CIP, OLE, etc.).

At 1308, the connector process creates a first communication channel from the cloud agent to a communication port of the new data source. At 1310, the connector process initiates extraction of industrial data (e.g., alarm data, historical data, live device or process data, etc.) from the data source. At 1312, customer-specific header information is applied to the extracted data by queue processing services executing on the cloud agent to yield a compressed data packet. At 1314, the agent analytics component initiates creation of a cloud connector port on the cloud agent that acts as a second communication channel between the cloud agent and the cloud platform. At 1316, the compressed data packet is sent to the cloud platform via the second communication channel.

Figure 14:
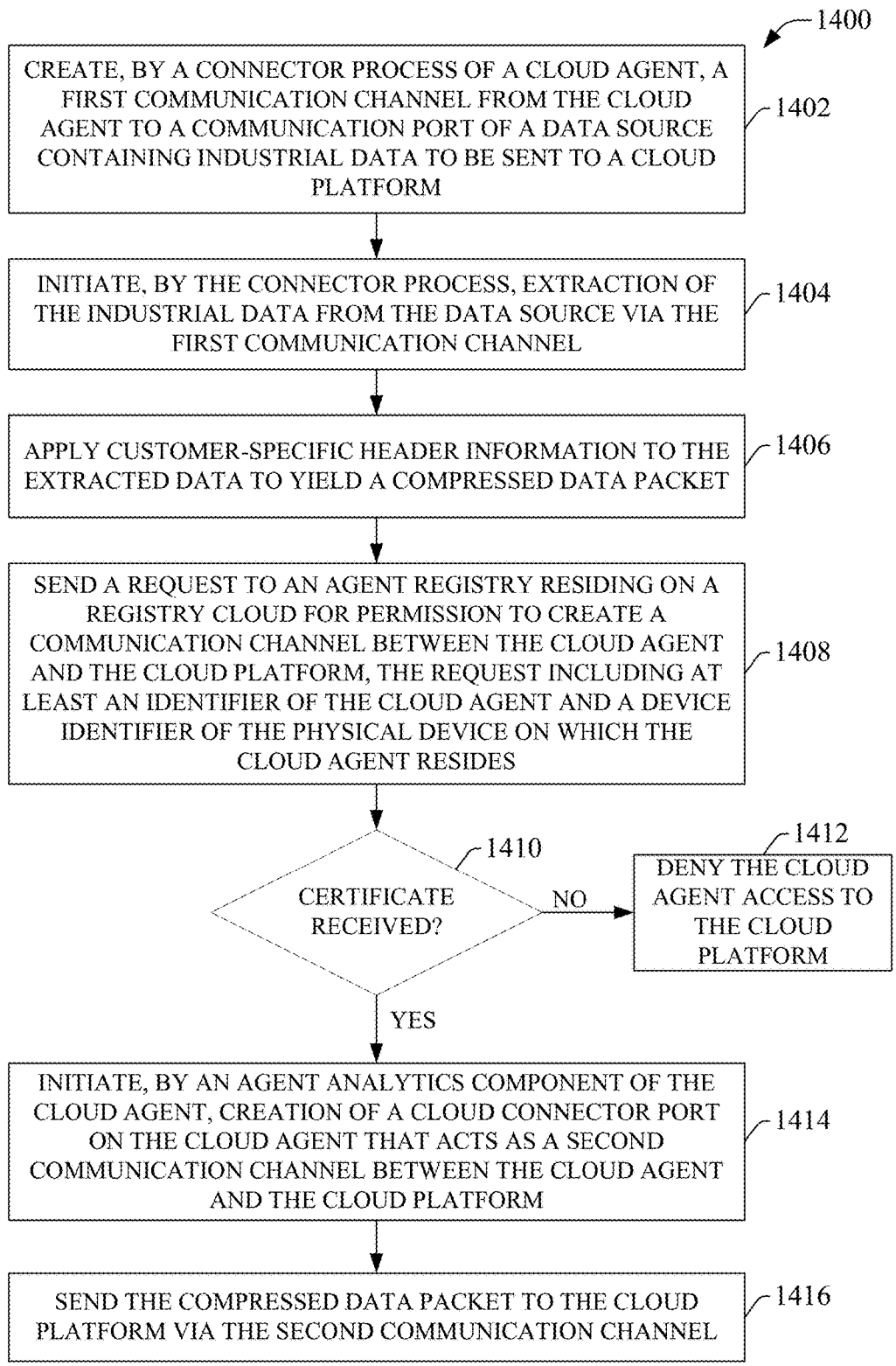
FIG. 14 is a flowchart of an example methodology for securely connecting a cloud agent to a cloud platform by handshaking with an agent registry.

FIG. 14 illustrates an example methodology 1400 for securely connecting a cloud agent to a cloud platform by handshaking with an agent registry. Initially, at 1402, a connector process of a cloud agent creates a first communication channel from the cloud agent to a communication port of a data source containing industrial data to be sent to a cloud platform. At 1404, the connector process initiates extraction of the industrial data from the data source via the first communication channel. At 1406, customer-specific header information is applied to the extracted data to yield a compressed data packet.

At 1408, a request for permission to create a communication channel between the cloud agent and the cloud platform is sent from the cloud agent to an agent registry residing on a registry cloud. The request can include at least an identifier of the cloud agent and a device identifier of the physical device on which the cloud agent resides and executes. The device identifier maybe, for example, a MAC address or other physical address for the device.

At 1410 a determination is made regarding whether a certificate has been received from the agent registry indicating that permission for the agent to establish the communication channel is granted. If the certificate has not been received, the methodology moves to step 1412 where the cloud agent is denied access to the cloud platform and no communication channel is established between the cloud agent and the cloud platform. Alternatively, if the certificate is received, the methodology moves to step 1414, where an agent analytics component of the cloud agent initiates creation of a cloud connector port on the cloud agent that acts as a second communication channel between the cloud agent and the cloud platform. At 1416, the compressed data packet is sent to the cloud via the second communication channel.

Figure 15:
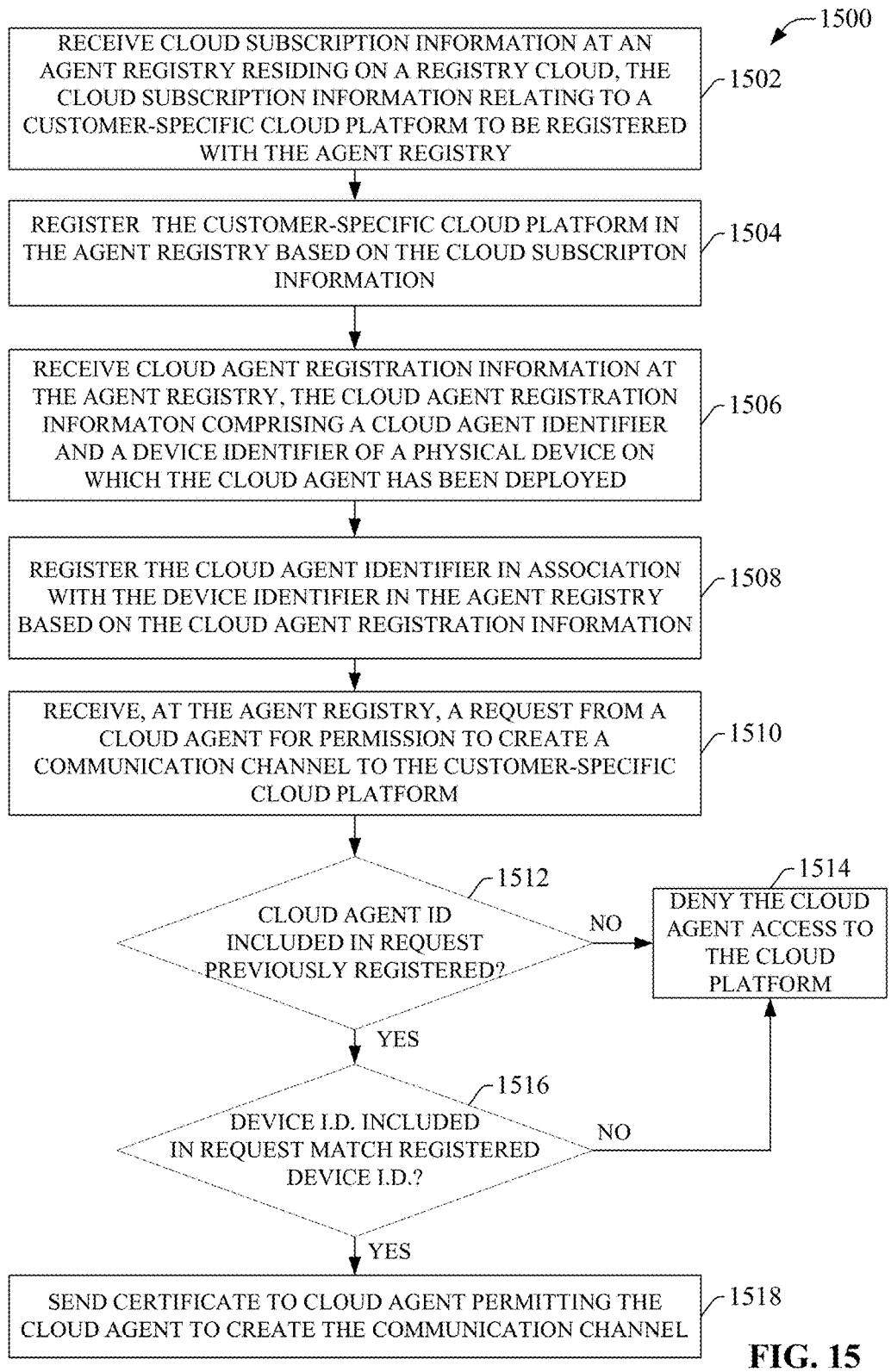
FIG. 15 is a flowchart of an example methodology for regulating secure access to a customer-specific cloud platform within a cloud agent architecture.

FIG. 15 illustrates an example methodology 1500 for regulating secure access to a customer-specific cloud platform within a cloud agent architecture. Initially, at 1502, cloud subscription information is received at an agent registry residing on a registry cloud. The cloud subscription information relates to a customer-specific cloud platform to be registered with the agent registry to facilitate secure, regulated access to the cloud platform. At 1504, the customer-specific cloud platform is registered in the agent registry based on the cloud subscription information.

At 1506, cloud agent registration information is received at the agent registry. The cloud agent registration information may be provided by an administrator of the registry cloud, and can include at least a cloud agent identifier and a device identifier of a physical device on which the identified cloud agent has been deployed. At 1508, the cloud agent identifier is registered with the agent registry in association with the device identifier based on the cloud agent registration information.

At 1510, a request is received at the agent registry from a cloud agent for permission to create a communication channel to the customer-specific cloud platform. At 1512, a determination is made regarding whether a cloud agent identifier included in the request was previously registered (e.g., using the methodology outlined in steps 1506-1508). If the cloud agent ID included in the request has not been registered, the methodology moves to step 1514, where the cloud agent is denied access to the cloud platform. Alternatively, if the cloud agent ID included in the request has been registered with the agent registry, a determination is made at 1516 regarding whether a device ID included in the request matches the device identifier associated with the cloud agent identifier in the agent registry. If the device ID included in the request does not match the device identifier registered in association with the cloud agent identifier (indicating that the cloud agent has been installed on a different physical device from that which had been registered for that cloud agent), the methodology moves to step 1514, where the cloud agent is denied access to the cloud platform. Alternatively, if the device ID included in the request matches the device identifier registered with the cloud agent identifier, the methodology moves to step 1518, where a certificate is sent to the cloud agent permitting the cloud agent to create the communication channel to the cloud platform.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the Internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 16:
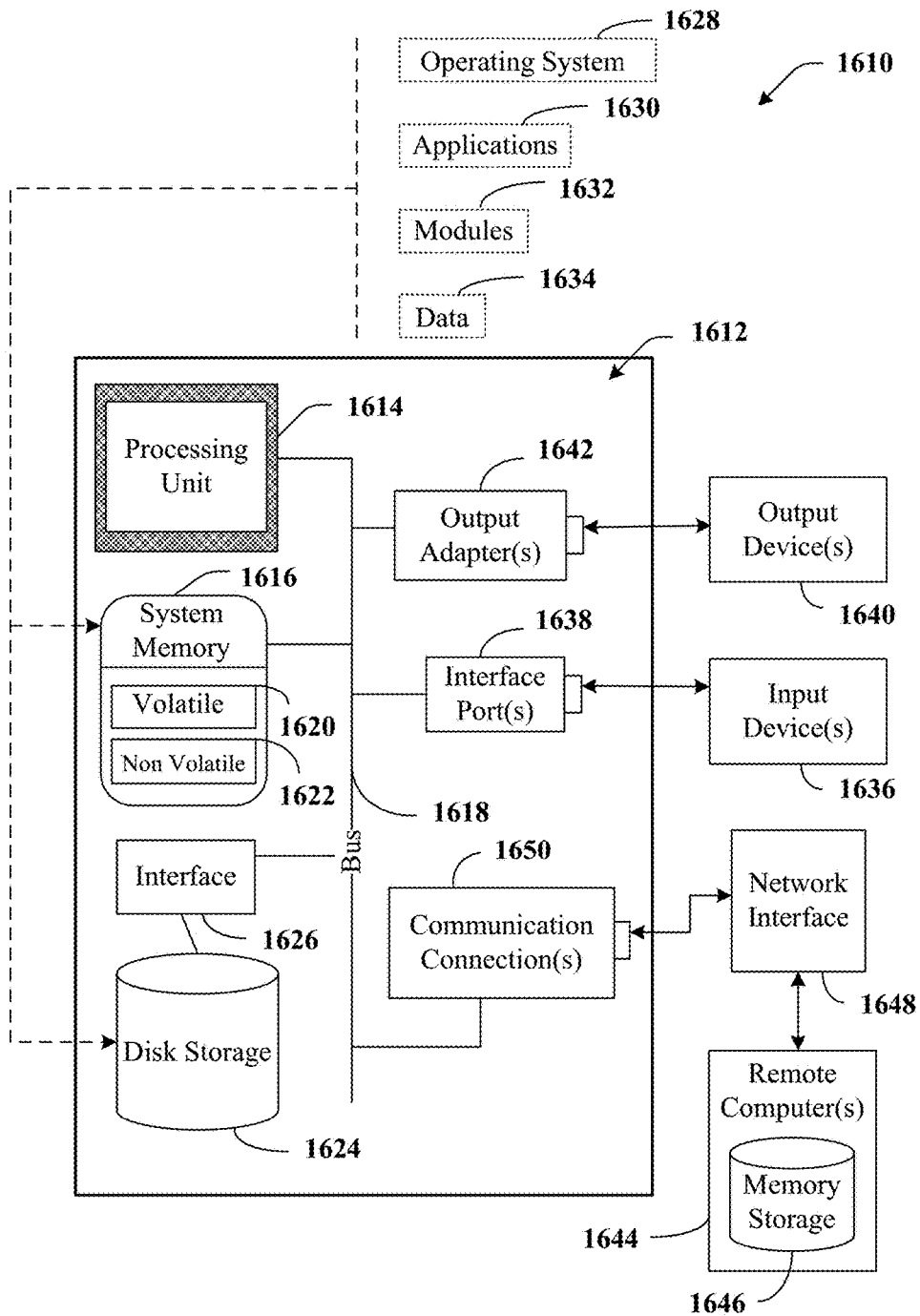
FIG. 16 is an example computing environment.
Figure 17:
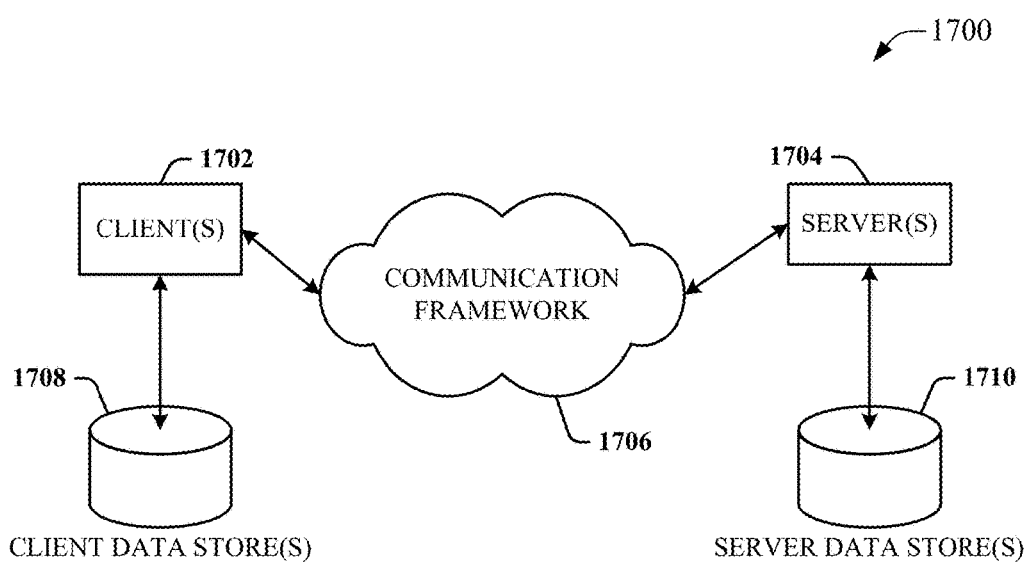
FIG. 17 is an example networking environment.

In order to provide a context for the various aspects of the disclosed subject matter, FIGS. 16 and 17 as well as the following discussion are intended to provide a brief, general description of a suitable environment in which the various aspects of the disclosed subject matter may be implemented.

With reference to FIG. 16, an example environment 1610 for implementing various aspects of the aforementioned subject matter includes a computer 1612. The computer 1612 includes a processing unit 1614, a system memory 1616, and a system bus 1618. The system bus 1618 couples system components including, but not limited to, the system memory 1616 to the processing unit 1614. The processing unit 1614 can be any of various available processors. Multi-core microprocessors and other multiprocessor architectures also can be employed as the processing unit 1614.

The system bus 1618 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable PROM (EEPROM), or flash memory. Volatile memory 1620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1612 also includes removable/non-removable, volatile/non-volatile computer storage media. FIG. 16 illustrates, for example a disk storage 1624. Disk storage 1624 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1624 to the system bus 1618, a removable or non-removable interface is typically used such as interface 1626.

It is to be appreciated that FIG. 16 describes software that acts as an intermediary between users and the basic computer resources described in suitable operating environment 1610. Such software includes an operating system 1628. Operating system 1628, which can be stored on disk storage 1624, acts to control and allocate resources of the computer 1612. System applications 1630 take advantage of the management of resources by operating system 1628 through program modules 1632 and program data 1634 stored either in system memory 1616 or on disk storage 1624. It is to be appreciated that one or more embodiments of the subject disclosure can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612, and to output information from computer 1612 to an output device 1640. Output adapters 1642 are provided to illustrate that there are some output devices 1640 like monitors, speakers, and printers, among other output devices 1640, which require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1650 refers to the hardware/software employed to connect the network interface 1648 to the system bus 1618. While communication connection 1650 is shown for illustrative clarity inside computer 1612, it can also be external to computer 1612. The hardware/software necessary for connection to the network interface 1648 includes, for exemplary purposes only, internal and external technologies such as, modems including regular telephone grade modems, cable modems and DSL modems, ISDN adapters, and Ethernet cards.

FIG. 17 is a schematic block diagram of a sample computing environment 1700 with which the disclosed subject matter can interact. The sample computing environment 1700 includes one or more client(s) 1702. The client(s) 1702 can be hardware and/or software (e.g., threads, processes, computing devices). The sample computing environment 1700 also includes one or more server(s) 1704. The server(s) 1704 can also be hardware and/or software (e.g., threads, processes, computing devices). The servers 1704 can house threads to perform transformations by employing one or more embodiments as described herein, for example. One possible communication between a client 1702 and servers 1704 can be in the form of a data packet adapted to be transmitted between two or more computer processes. The sample computing environment 1700 includes a communication framework 1706 that can be employed to facilitate communications between the client(s) 1702 and the server(s) 1704. The client(s) 1702 are operably connected to one or more client data store(s) 1708 that can be employed to store information local to the client(s) 1702. Similarly, the server(s) 1704 are operably connected to one or more server data store(s) 1710 that can be employed to store information local to the servers 1704.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A cloud agent device, comprising:
a memory that stores computer-executable components;
a processor, operatively coupled to the memory, that executes the computer-executable components, the computer-executable components comprising:
    a collection services component configured to receive industrial data from a data source device of an industrial enterprise and to compress the industrial data to yield a compressed data file; and
    a queue processing component configured to package the compressed data file with header information based on message queuing information maintained in a message queuing data store to yield a compressed data packet and to send the compressed data packet to a cloud platform,
wherein
the queue processing component is further configured to upload manifest data to the cloud platform, the manifest data defining, for respective priority queues configured in the cloud platform, customer-specific preferences relating to processing of industrial data received at the cloud platform and assigned to the priority queues, and the customer-specific preferences defining, for the respective priority queues, at least a processing priority for the industrial data, an upload frequency for the industrial data, and a storage location within the cloud storage for the industrial data,
the industrial data contained in the compressed data packet is assigned to one of the priority queues selected based on the header information contained in the compressed data packet, and is processed by a data process service that executes on the cloud platform in accordance with the manifest data to yield processed data, and
a reporting services component on the cloud platform delivers the processed data to a client device in a defined format.

2. The cloud agent device of claim 1, wherein the header information comprises at least one of the customer identifier, a site identifier associated with a plant facility, a virtual service engineer identifier, priority information, a message type identifier indicating a type of the industrial data, or a process identifier indicating a type of processing to be performed on the industrial data.

3. The cloud agent device of claim 1, wherein information contained in the header information corresponds to an identity of a subset of the manifest data to be executed on the industrial data contained in the compressed data file.

4. The cloud agent device of claim 1, wherein the queue processing component is further configured to, in response to creation of the compressed data packet, send request data to an agent registry device residing on a registry cloud platform, and wherein the request data comprises a cloud agent identifier that identifies the queue processing component and a device identifier that identifies the cloud agent device.

5. The cloud agent device of claim 4, wherein the queue processing component is further configured to create a communication channel to the cloud platform in response to receipt of certification data from the agent registry device indicating permission for the queue processing component to exchange data with the cloud platform.

6. The cloud agent device of claim 1, wherein the message queuing information further comprises a security setting that permits access to the cloud platform by the cloud agent device.

7. The cloud agent device of claim 1, further comprising an interface component configured to receive configuration input that sets at least one parameter of one or both of the collection services component or the queue processing component, wherein the at least one parameter comprises at least one of a type of data compression to be performed on the industrial data, a type of encryption to be performed on the industrial data, an expiration time for a communication channel between the cloud agent device and the cloud platform, or a processing priority to be associated with a specified data type.

8. The cloud agent device of claim 1, wherein the queue processing component is further configured to store the compressed data packet on the memory in response to a determination that a communication channel between the cloud agent and the cloud platform is disabled, and to forward the compressed data packet to the cloud platform in response to a determination that the communication channel has been reestablished.

9. The cloud agent device of claim 1, wherein the message queuing information comprises at least a customer identifier associated with the industrial enterprise and priority information defining multiple priority queues maintained on the cloud platform and corresponding to respective multiple data types, the data types comprising at least an alarm data type, a historical data type, and a live data type.

10. A method for sending industrial data to a cloud platform, comprising:
uploading, by a cloud agent device comprising at least one processor, manifest data to a cloud platform device of a cloud platform, wherein the manifest data defines, for respective priority queues configured in the cloud platform, customer-specific preferences relating to processing of data received at the cloud platform device and assigned to the priority queues, and wherein the customer-specific preferences define, for the respective priority queues, at least a processing priority for the data, an upload frequency for the data, and a storage location within the cloud storage for the data;

collecting, by the cloud agent device, industrial data from a data source device of an industrial enterprise;

compressing, by the cloud agent device, the industrial data to yield a compressed data file;

appending, by the cloud agent device, the compressed data file with header information based on message queuing information maintained in a message queuing data store to yield a compressed data packet, wherein the header information identifies one of the priority queues to which the industrial data contained in the compressed data packet is to be assigned; and sending, by the cloud agent device, the compressed data packet to the cloud platform device, wherein the sending causes the industrial data contained in the compressed data packet to be processed by a data process service that executes on the cloud platform in accordance with a subset of the manifest data associated with the one of the priority queues to yield processed data, and wherein the processed data is sent to a client device in a defined format.

11. The method of claim 10, further comprising:
storing association data in the message queuing data store, wherein the association data associates the multiple priority queues with the respective data types.

12. The method of claim 10, wherein the appending the header information comprises appending at least one of a customer identifier, a site identifier associated with a plant facility, a virtual service engineer identifier, priority information, a message type identifier indicating a type of the industrial data, or a process identifier indicating a type of processing to be performed on the industrial data.

13. The method of claim 10, wherein the header information identifies the subset of the manifest data to be retrieved by the data process service in the cloud platform and executed on the industrial data contained in the compressed data packet.

14. The method of claim 10, further comprising, in response to generation of the compressed data packet, sending request data to an agent registry device located on a registry cloud platform, wherein the request data comprises a cloud agent identifier that identifies a cloud agent instance executing on the cloud agent device and a device identifier that identifies a hardware platform on which the cloud agent instance executes.

15. The method of claim 14, further comprising:
receiving, by the cloud agent device, certification data from the agent registry device; and
in response to receiving the certification data, establishing, by the cloud agent device, a communication channel to the cloud platform.

16. The method of claim 10, wherein the message queuing information comprises at least a customer identifier associated with the industrial enterprise and priority information defining the priority queues maintained on a cloud platform, and wherein the priority queues are associated with respective data types comprising at least an alarm data type, a historical data type, and a live data type.

17. A non-transitory computer-readable medium having stored thereon instructions that, in response to execution, cause a cloud agent device comprising a processor to perform operations, the operations comprising:

uploading manifest data to a cloud platform device of a cloud platform, wherein the manifest data defines, for respective priority queues configured on the cloud platform, customer-specific preferences relating to processing of data received at the cloud platform device and assigned to the priority queues, and wherein the customer-specific preferences define, for the respective priority queues, at least a processing priority for the data, an upload frequency for the data, and a storage location within the cloud storage for the data;

receiving industrial data from a data source device associated with an industrial enterprise;

compressing the industrial data to generate a compressed data file;

packaging the compressed data file with header information retrieved from a message queuing data store based on a type of the industrial data to yield a compressed data packet, wherein the header information identifies one of the priority queues to which the industrial data contained in the compressed data packet is to be assigned; and sending the compressed data packet to the cloud platform device, wherein the sending causes the industrial data contained in the compressed data packet to be processed by a data process service that executes on the cloud platform in accordance with a subset of the manifest data associated with the one of the priority queues to yield processed data, and wherein the processed data is sent to a client device in a defined format.

18. The non-transitory computer-readable medium of claim 17, further comprising:
in response to creation of the compressed data packet, sending request data to an agent registry device that executes on a registry cloud platform, wherein the request data comprises a cloud agent identifier that identifies a cloud agent instance executing on the cloud agent device and a device identifier that identifies a hardware platform on which the cloud agent instance executes; and
in response to receiving certification data from the agent registry device, creating a communication channel to the cloud platform.

19. The non-transitory computer-readable medium of claim 17, wherein the packaging the compressed data file with the header information comprises appending, to the compressed data file, at least one of a site identifier associated with a plant facility, a virtual service engineer identifier, a message type identifier indicating a type of the industrial data, or a process identifier indicating a type of processing to be performed on the industrial data.

20. The non-transitory computer-readable medium of claim 17, further comprising, in response to generation of the compressed data packet, sending request data to an agent registry device located on a registry cloud platform, wherein the request data comprises a cloud agent identifier that identifies a cloud agent instance executing on the cloud agent device and a device identifier that identifies a hardware platform on which the cloud agent instance executes.

* * * * *